US007929610B2

(12) United States Patent
Sun

(10) Patent No.: US 7,929,610 B2
(45) Date of Patent: Apr. 19, 2011

(54) METHODS AND SYSTEMS FOR REDUCING BLOCKING ARTIFACTS WITH REDUCED COMPLEXITY FOR SPATIALLY-SCALABLE VIDEO CODING

(75) Inventor: Shijun Sun, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 1100 days.

(21) Appl. No.: 11/350,181

(22) Filed: Feb. 7, 2006

(65) Prior Publication Data

US 2006/0126962 A1 Jun. 15, 2006

Related U.S. Application Data

(63) Continuation-in-part of application No. 10/112,683, filed on Mar. 29, 2002, now Pat. No. 7,352,812, which is a continuation of application No. 09/817,701, filed on Mar. 26, 2001, now Pat. No. 6,931,063, application No. 11/350,181, which is a continuation-in-part of application No. 10/799,384, filed on Mar. 11, 2004, now abandoned, which is a continuation of application No. PCT/JP02/09306, filed on Sep. 11, 2002, which is a continuation of application No. 09/953,329, filed on Sep. 14, 2001, now Pat. No. 7,450,641.

(60) Provisional application No. 60/663,161, filed on Mar. 18, 2005, provisional application No. 60/683,060, filed on May 20, 2005, provisional application No. 60/686,676, filed on Jun. 1, 2005.

(51) Int. Cl.
*H04B 1/66* (2006.01)

(52) U.S. Cl. ......... 375/240.16; 375/240.13; 375/240.12; 375/240.14; 375/240.15; 375/240.24; 382/238; 382/235; 382/239

(58) Field of Classification Search ............. 375/240.16, 375/240.13, 240.12, 240.14, 240.15, 240.24; 382/235, 238, 239
See application file for complete search history.

(56) References Cited

U.S. PATENT DOCUMENTS

| 5,473,384 A | 12/1995 | Jayant et al. |
| 5,479,211 A | 12/1995 | Fukuda et al. |
| 5,565,921 A | 10/1996 | Sasaki et al. |
| 5,654,759 A | 8/1997 | Augenbraun et al. |

(Continued)

FOREIGN PATENT DOCUMENTS

CA 2 374 523 A1 7/2001

(Continued)

OTHER PUBLICATIONS

Derviaux C et al: "Blocking artifact reduction of DCT coded image sequences using a visually adaptive postprocessing", Proceedings of the International Conference on Image Processing (ICIP) Lausanne, Sep. 16-19, 1996 New York, IEEE, US, vol. 1, Sep. 16, 1996, pp. 5-8 XP010202580 isbn: 0-7803-3259-8 pp. 6-7, Paragraph 2.1.2-Paragraph 2.3.

(Continued)

*Primary Examiner* — Shawn An
(74) *Attorney, Agent, or Firm* — Birch, Stewart, Kolasch & Birch, LLP

(57) ABSTRACT

Embodiments of the present invention comprise systems and methods for characterization of block boundaries for filtering operations in spatial scalable video coding. Some embodiments of the present invention comprise methods and systems designed for use with the Scalable Video Coding extension of H.264/MPEG-4 AVC.

18 Claims, 26 Drawing Sheets

U.S. PATENT DOCUMENTS

| | | | |
|---|---|---|---|
| 5,787,204 | A | 7/1998 | Fukuda |
| 5,933,542 | A | 8/1999 | Chang et al. |
| 5,949,908 | A | 9/1999 | Sugahara |
| 5,974,196 | A | 10/1999 | Chang et al. |
| 5,987,184 | A * | 11/1999 | Kweon et al. ............... 382/250 |
| 6,044,177 | A | 3/2000 | Herley |
| 6,057,884 | A | 5/2000 | Chen et al. |
| 6,104,434 | A | 8/2000 | Nakagawa et al. |
| 6,115,503 | A | 9/2000 | Kaup |
| 6,144,700 | A | 11/2000 | Kim |
| 6,167,157 | A | 12/2000 | Sugahara |
| 6,748,113 | B1 | 6/2004 | Kondo et al. |
| 7,627,034 | B2 * | 12/2009 | Park et al. ............... 375/240.08 |
| 2001/0017944 | A1 | 8/2001 | Kalevo et al. |
| 2004/0101059 | A1 | 5/2004 | Joch et al. |
| 2006/0146941 | A1 | 7/2006 | Cha et al. |
| 2007/0160133 | A1 * | 7/2007 | Bao et al. ............... 375/240.1 |

FOREIGN PATENT DOCUMENTS

| | | |
|---|---|---|
| EP | 0714209 | 5/1996 |
| EP | 0777388 | 6/1997 |
| EP | 0838955 | 4/1998 |
| JP | 05-227518 A | 9/1993 |
| JP | 08-205178 A | 8/1996 |
| JP | 10-191351 A | 7/1998 |
| JP | 11-018085 A | 1/1999 |
| JP | 11-275584 | 10/1999 |
| JP | 2000-299864 | 10/2000 |
| JP | 2001-094996 | 4/2001 |
| JP | 2001-204029 A | 7/2001 |
| JP | 2001-224031 | 8/2001 |
| JP | 2006-191576 A | 7/2006 |
| KR | 1997-78645 | 12/1997 |
| WO | WO-00/14685 A1 | 3/2000 |

OTHER PUBLICATIONS

"H.26L Test Model Long Term No. 6 (TML-6) Draft 0" ITU-T Telecommunication Standardization Sector of ITU, Geneva, Ch.9 (Jan. 9, 2001) pp. 1-35, XP001089815 pp. 19-22, paragraph 4.5.

Lee Y et al: "Loop Filtering and post-filtering for low bit-rates moving picture coding" Image Processing, 1999 ICIP Proceedings, 1999 International Conference on Kobe, Japan Oct. 24-28, 1999, Piscataway, NJ, USA, IEEE, US, vol. 1, Oct. 24, 1999, pp. 94-98, XPO10369215 ISBN: 0-7803-5467-2 pp. 94-96, paragraph 2-paragraph 3.

Park H W et al: "A Postprocessing Method for Reducing Quantization Effects in Low Bit-Rate Mocing Picture Coding" IEEE Transaction on Circuits and Systems for Technology, IEEE Inc. NewYork, US, vol. 9, No. 1 Feb. 1999, pp. 161-171, XPO00802295 ISSN: 1051-8215, pp. 161-163, paragraph 11-paragraph 111.a.

Shijun Sun et al: "Loop Filter with Skip mode (VCEG-M20)" ITU Telecommunications Standardization Sector Study Group 16, XX, XX, vol. VCEG-M20, Mar. 27, 2001, pp. 1-8, XP002321426, p. 1, paragraph 2.

Peter List: "Report of the AD Hoc Committee on Loop Filter Improvement (VCEG-N08)" ITU Telecommunications Standardization Sector Study Group 16, XX, XX, Sep. 4, 2001, pp. 1-3, XPO02347724, p. 2, paragraph 4.5.

Edouard Francois, Extended spatial scalability, International Organisation for Standardisation Organisation Internationale De Normalisation,ISO/IEC JTC1/SC29/WG11, Coding of Moving Pictures and Audio, ISO/IEC JTC1/SC29/WG11, MPEG2005/M11669, Jan. 2005, Hong Kong, China.

International Organisation for Standardisation, Organisation Internationale De Normalisation, Coding of Moving Pictures and Audio, ISO/IEC JTC1/SC29/WG11/N6898, Hong Kong, Jan. 2005.

Joint Video Team (JVT) of ISO/IEC MPEG & ITU-T VCEG, (ISO/IEC JTC1/SC29/WG11 and ITU-T SG16 Q.6), Working Draft 1.0 of 14496-10:200x/AMD1 Scalable Video Coding International Organization for Standardization,Organisation Internationale Normalisation, Coding of Moving Pictures and Audio, ISO/IEC JTC 1/SC 29/WG 11 N6901, Jan. 2005, Hong Kong, China *relevant section—section 6 *.

Ken Turkowski, "Filters for Common Resampling Tasks", Graphics Gems I, Academic Press, Apple Computer, Apr. 1990.

Bjontegaard, "H.26L Test Model Long Term No. 7 (TML-7) draft0", Apr. 2-4, 2001.

List, Peter et al., H.26L Test Model Long Term No. 8.4 (TML-8.4) Software, Module: loop-filter.c, ITU Telecommunications Standardization Sector Study Group 16, VCEG, Aug. 29, 2001, pp. 1-3, XP002440062, Santa Barbara, CA, USA.

Kim, Chul-Woo, Simplified Loop Filter for Mobile Service, ITU-Telecommunications Standardization Sector, Study Group 16, Question 6, Video Coding Experts Group (VCEG), Mar. 28, 2001, pp. 1-3.

Kim, Sung Deuk, A Deblocking Filter with Two Separate Modes in Block-Based Video Coding, IEEE Transactions on Circuits and Systems for Video Technology, vol. 9, No. 1, Feb. 1999, pp. 156-160.

Meier, Thomas, Reduction of Blocking Artifacts in Image and Video Coding, IEEE Transactions on Circuits and Systems for Video Technology, vol. 9, No. 3, Apr. 1999, pp. 490-500.

Sun, Shijun, Improved TML Loop Filter with Lower Complexity, ITU-Telecommunications Standardization Sector, Study Group 16, Question 6, Video Coding Experts Group (VCEG), Aug. 14, 2001, pp. 1-8.

Bjontegaard, Gisle, H.26L Test Model Long Term No. 6 (TML-6) draft0, ITU-Telecommunications Standardization Sector, Study Group 16, Video Coding Experts Group (VCEG), Mar. 3, 2001, pp. 1, 20-22.

Woo-Jin Han et al., Responses of SVC CE-3: Inter-layer prediction, ITU Study Group 16—Video Coding Experts Group—ISO/IEC MPEG & ITU-T VCEG(ISO/IEC JTC1/SC29/WG11 and ITU-T SG16 Q6), No. M11585, Jan. 11, 2005, XP030040330.

List, P. et al., Adaptive Deblocking Filter, IEEE Transactions on Circuits and Systems for Video Technology, IEEE Service Center, Piscataway, NJ, US LNKD-DOI: 10.1109/TCSVT.2003.815175, vol. 13, No. 7, Jul. 1, 2003, pp. 614-619, XP011221094, ISSN: 1051-8215.

Shijun Sun et al., Improved TML Loop Filter with Lower Complexity, ITU Study Group 16—Video Coding Experts Group—ISO/IEC MPEG & ITU-T VCEG(ISO/IEC JTC1/SC29/WG11 and ITU-T SG16 Q6), No. VCEG-N17, Sep. 20, 2001, XP030003269.

Working Draft 1.0 of 14496-10:200x/AMD1 Scalable Video Coding, ITU Study Group 16—Video Coding Experts Group—ISO/IEC MPEG & ITU-T VCEG(ISO/IEC JTC1/SC29/WG11 and ITU-T SG16), No. N6901, Feb. 5, 2005, XP030013621.

He, Y.; Wu, F.; Li, S.; Zhong, Y.; Yang, S., H.26L-Based Fine Granularity Scalable Video Coding, Proceedings—IEEE International Symposium on Circuits and Systems, vol. 4, 2002, pp. IV-548-IV-551, XP002593544, ISSN: 0271-4310.

Working Draft 4 of ISO/IEC 14496-10:200x Amd.3 Scalable Video Coding, ITU Study Group 16—Video Coding Experts Group—ISO/IEC MPEG & ITU-T VCEG(ISO/IEC JTC1/SC29/WG11 and ITU-T SG16 06), No. N7555, Oct. 28, 2005, XP030014100.

"Index of /av-arch/video-site/0109_San", Sep. 4, 2001, pp. 1-4, XP002606104.

Karsten Suehring: "Release of reference software TML 8.4" tml84changes.txt. Sep. 3, 2001, XP002606232.

* cited by examiner

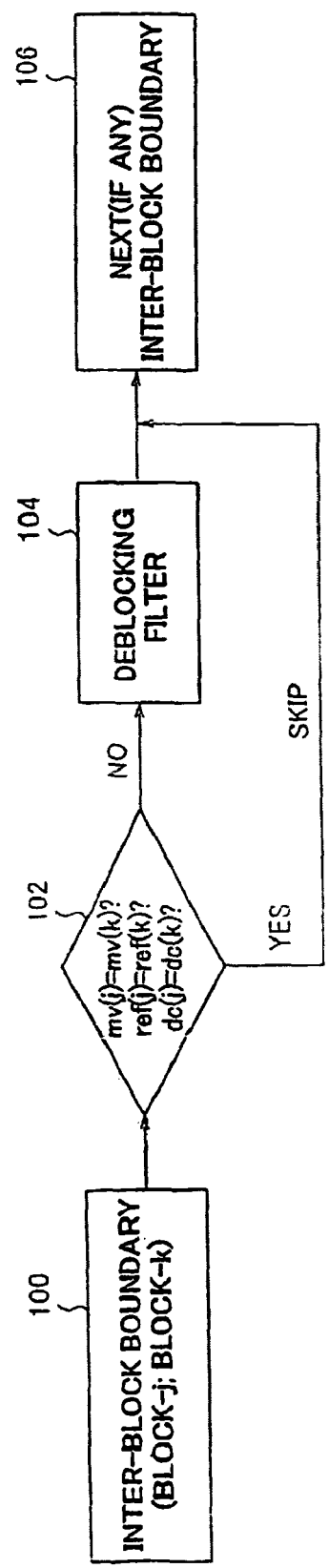

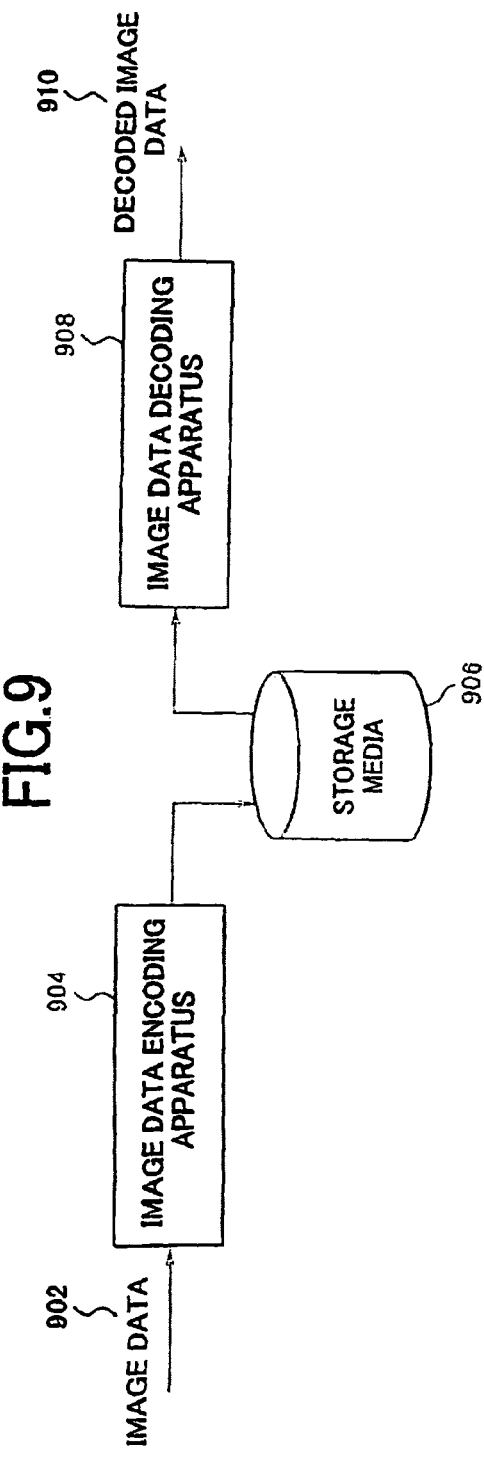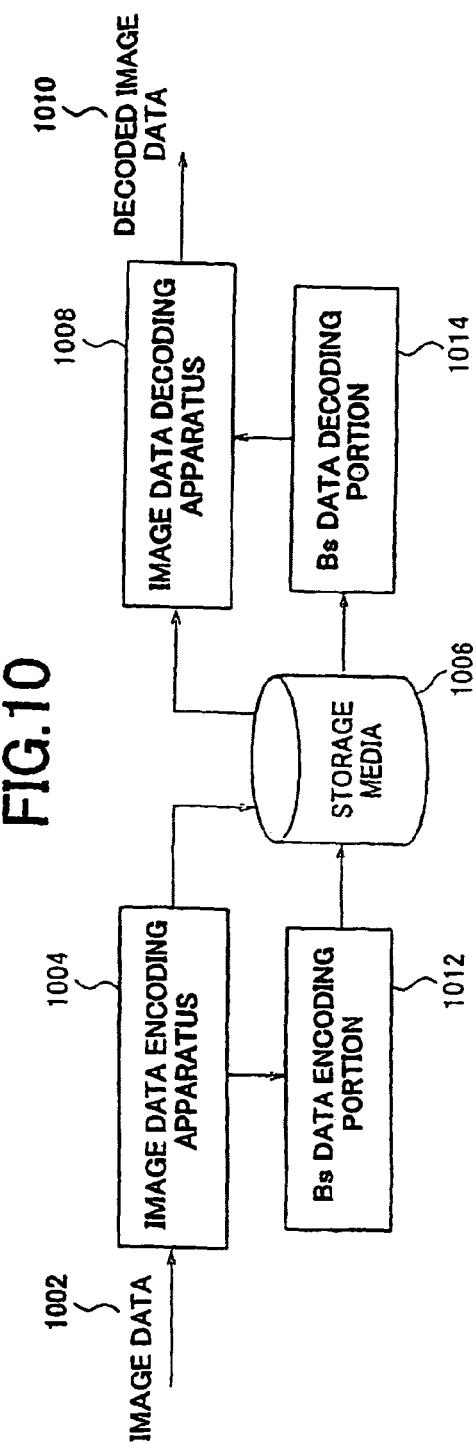

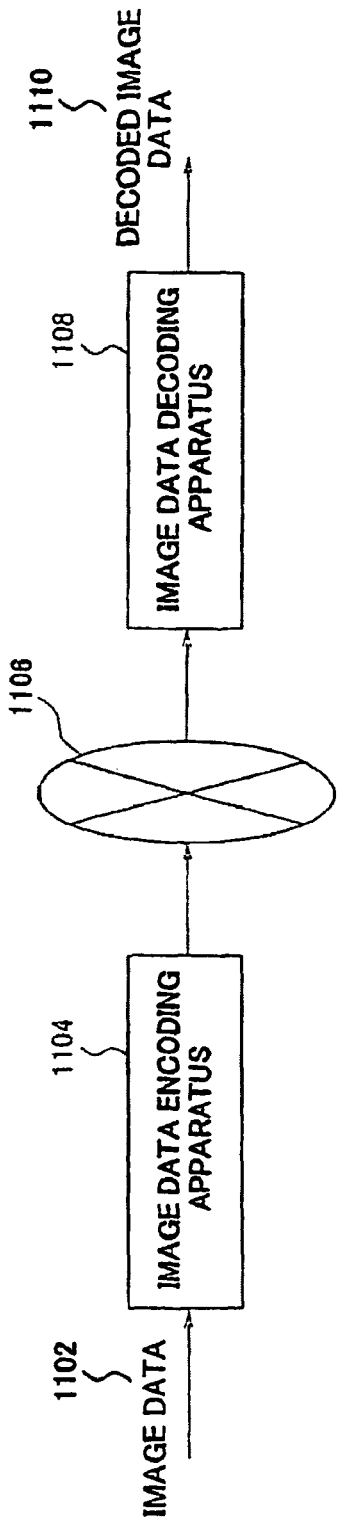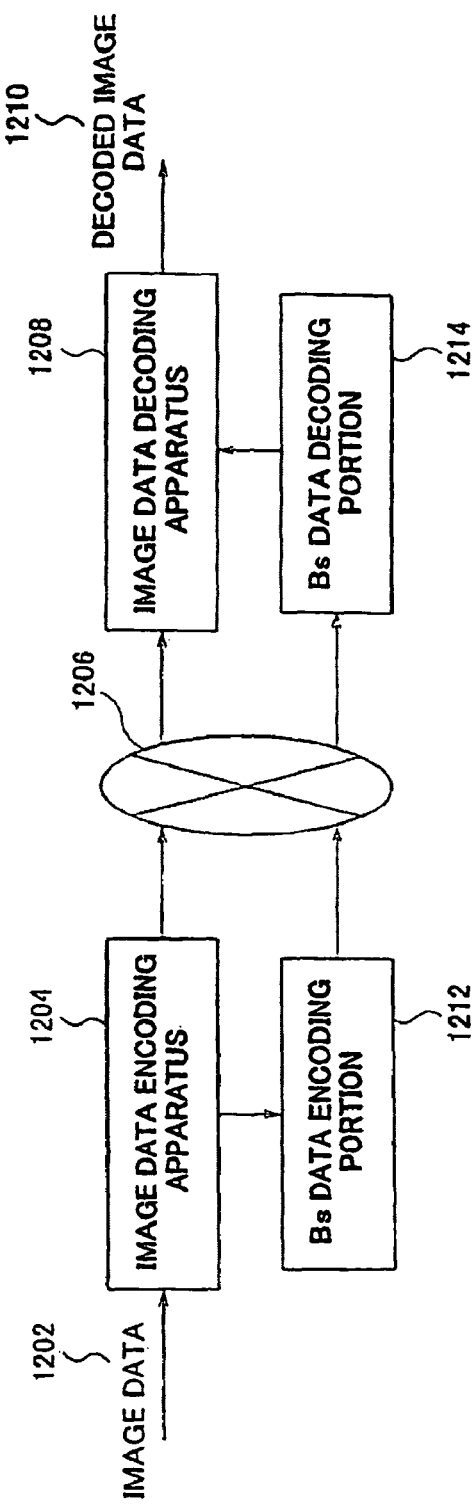

METHODS AND SYSTEMS FOR REDUCING BLOCKING ARTIFACTS WITH REDUCED COMPLEXITY FOR SPATIALLY-SCALABLE VIDEO CODING

RELATED REFERENCES

This application claims the benefit of U.S. Provisional Patent Application No. 60/663,161, entitled "Extended spatial scalability with picture-level adaptation," filed Mar. 18, 2005, invented by Shijun Sun; this application also claims the benefit of U.S. Provisional Patent Application No. 60/683,060, entitled "Direct interpolation for up-sampling in extended spatial scalability," filed May 20, 2005, invented by Shijun Sun; this application also claims the benefit of U.S. Provisional Patent Application No. 60/686,676, entitled "Deblocking Filter Method with Reduced Complexity for Spatial Scalable Video Coding," filed Jun. 1, 2005, invented by Shijun Sun; this application is also a continuation-in-part of U.S. patent application Ser. No. 10/112,683, entitled "Method and Apparatus for Controlling Loop Filtering or Post Filtering in Block Based Motion Compensationed Video Coding," filed on Mar. 29, 2002, U.S. Pat. No. 7,352,812 invented by Shijun Sun and Shawmin Lei, which is a continuation of U.S. patent application Ser. No. 09/817,701, entitled "Method and Apparatus for Controlling Loop Filtering or Post Filtering in Block Based Motion Compensationed Video Coding," filed on Mar. 26, 2001, now U.S. Pat. No. 6,931,063 invented by Shijun Sun et al; this application is also a continuation-in-part of U.S. patent application Ser. No. 10/799,384, entitled "Adaptive Filtering Based Upon Boundary Strength," filed on Mar. 11, 2004, now abandoned invented by Shijun Sun, which is a continuation of PCT Patent Application No. PCT/JP02/09306, filed on Sep. 11, 2002, invented by Shijun Sun et al; which is a continuation of U.S. patent application Ser. No. 09/953,329, entitled "Adaptive Filtering Based Upon Boundary Strength," filed on Sep. 14, 2001, now U.S. Pat. No. 7,450,641 invented by Shijun Sun and Shawmin Lei.

FIELD OF THE INVENTION

Embodiments of the present invention comprise methods and systems for image block boundary filtering control. Some embodiments of the present invention comprise methods and systems for characterizing a block boundary between neighboring blocks within a spatial scalability enhancement layer for controlling deblocking filter operations.

BACKGROUND

H.264/MPEG-4 AVC [Joint Video Team of ITU-T VCEG and ISO/IEC MPEG, "Advanced Video Coding (AVC)—4$^{th}$ Edition," ITU-T Rec. H.264 and ISO/IEC 14496-10 (MPEG4-Part 10), January 2005], which is incorporated by reference herein, is a video codec specification that uses macroblock prediction followed by residual coding to reduce temporal and spatial redundancy in a video sequence for compression efficiency. Spatial scalability refers to a functionality in which parts of a bitstream may be removed while maintaining rate-distortion performance at any supported spatial resolution. Single-layer H.264/MPEG-4 AVC does not support spatial scalability. Spatial scalability is supported by the Scalable Video Coding (SVC) extension of H.264/MPEG-4 AVC.

The SVC extension of H.264/MPEG-4 AVC [Working Document 1.0 (WD-1.0) (MPEG Doc. N6901) for the Joint Scalable Video Model (JSVM)], which is incorporated by reference herein, is a layered video codec in which the redundancy between spatial layers is exploited by inter-layer prediction mechanisms. Three inter-layer prediction techniques are included into the design of the SVC extension of H.264/MPEG-4 AVC: inter-layer motion prediction, inter-layer residual prediction, and inter-layer intra texture prediction.

Block based motion compensated video coding is used in many video compression standards such as H.261, H.263, H264, MPEG-1, MPEG-2, and MPEG-4. The lossy compression process can create visual artifacts in the decoded images, referred to as image artifacts. Blocking artifacts occur along the block boundaries in an image and are caused by the coarse quantization of transform coefficients.

Image filtering techniques can be used to reduce artifacts in reconstructed images. Reconstructed images are the images produced after being inverse transformed and decoded. The rule of thumb in these techniques is that image edges should be preserved while the rest of the image is smoothed. Low pass filters are carefully chosen based on the characteristic of a particular pixel or set of pixels surrounding the image edges.

Non-correlated image pixels that extend across image block boundaries are specifically filtered to reduce blocking artifacts. However, this filtering can introduce blurring artifacts into the image. If there are little or no blocking artifacts between adjacent blocks, then low pass filtering needlessly incorporates blurring into the image while at the same time wasting processing resources.

Previously, only dyadic spatial scalability was addressed by SVC. Dyadic spatial scalability refers to configurations in which the ratio of picture dimensions between two successive spatial layers is a power of 2. New tools that manage configurations in which the ratio of picture dimensions between successive spatial layers is not a power of 2 and in which the pictures of the higher level can contain regions that are not present in corresponding pictures of the lower level, referred to as non-dyadic scaling with cropping window, have been proposed.

All of the inter-layer prediction methods comprise picture up-sampling. Picture up-sampling is the process of generating a higher resolution image from a lower resolution image. Some picture up-sampling processes comprise sample interpolation. The prior up-sampling process used in the SVC design was based on the quarter luma sample interpolation procedure specified in H.264 for inter prediction. When applied to spatially scalable coding, the prior method has the following two drawbacks: the interpolation resolution is limited to quarter samples, and thus, is not supportive of non-dyadic scaling; and half-sample interpolation is required in order to get a quarter-sample position making this method computationally cumbersome. A picture up-sampling process that overcomes these limitations is desired.

SUMMARY

Embodiments of the present invention comprise methods and systems for image encoding and decoding. Some embodiments of the present invention comprise methods and systems for characterization of a block boundary between neighboring blocks within a spatial scalability enhancement layer. In some embodiments, at least one of the neighboring blocks is encoded using inter-layer texture prediction. A block boundary may be characterized with a boundary strength indicator when one of said neighboring blocks meets specified criteria.

The foregoing and other objectives, features, and advantages of the invention will be more readily understood upon consideration of the following detailed description of the invention taken in conjunction with the accompanying drawings.

BRIEF DESCRIPTION OF THE DRAWINGS

FIG. 6 is a block diagram showing how deblock filtering is selectively skipped in a codec.

FIG. 7 is a representation of an existing block based image filtering technique.

FIG. 9 is a drawing to explain other embodiments of the present invention

FIG. 10 is a drawing to explain further embodiments of the present invention.

FIG. 11 is a drawing to explain further embodiments of the present invention.

FIG. 12 is a drawing to explain further embodiments of the present invention.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Conventional filtering processes consider a single reconstructed image frame at a time. Block based video encoding techniques may use motion vectors to estimate the movement of blocks of pixels. The motion-vector information is available at both the encoder and decoder but is not used with conventional filtering processes. For example, if two adjacent blocks share the same motion vector with respect to the same reference image frame, (for a multiple reference frames system) there is likely no significant difference between the image residuals of each block and accordingly should not be filtered. In essence, adjacent portions of the image have the same motion with respect to the same reference frame and accordingly no significant difference between the image residuals would be expected. In many cases, the block boundary of these two adjacent blocks may have been filtered in the reference frame and should therefore not be filtered again for the current frame. If a deblock filter is used without considering this motion-vector information, the conventional filtering process might filter the same boundary again and again from frame to frame. This unnecessary filtering not only causes unnecessary blurring but also results in additional filter computations.

Figure 1:
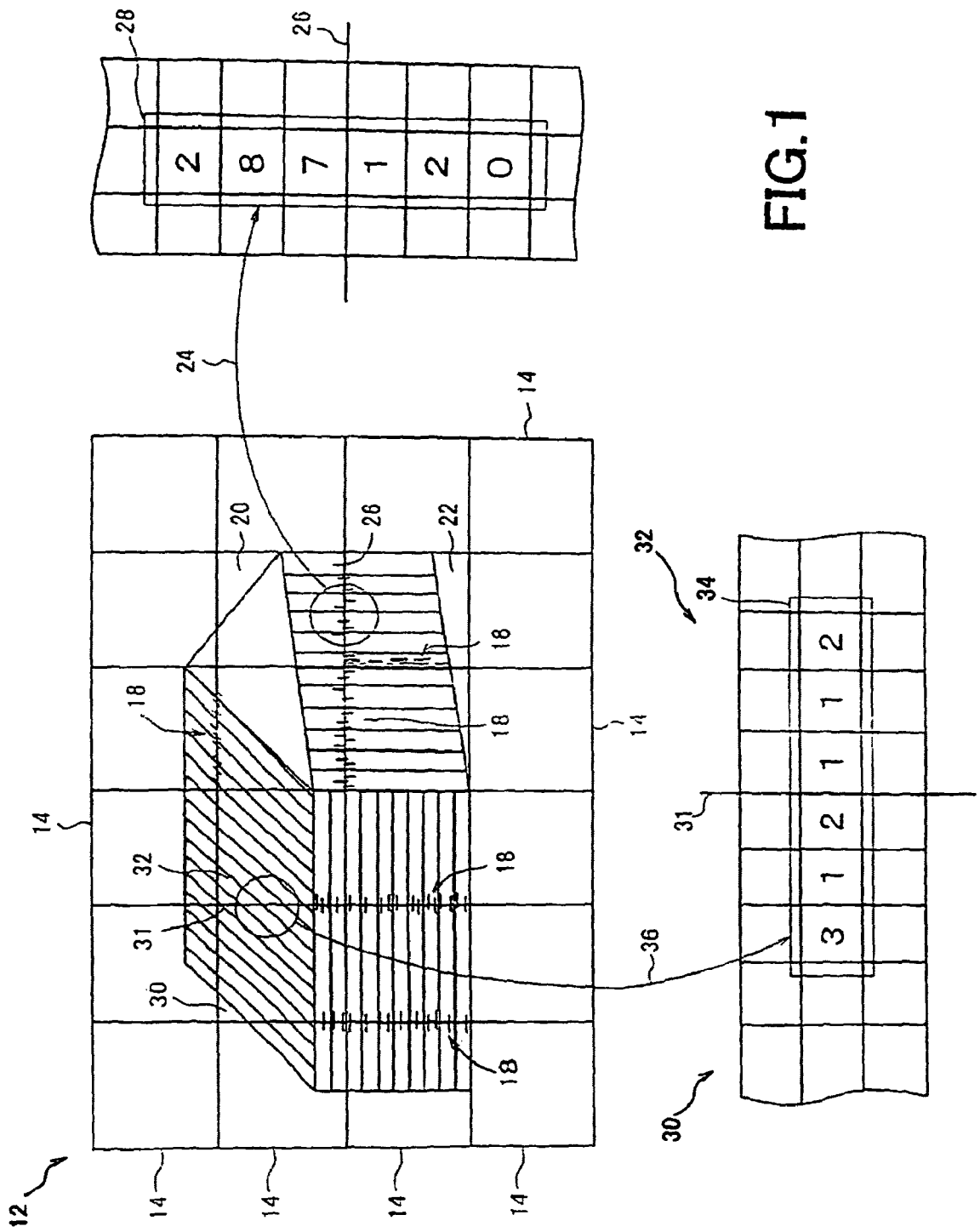
FIG. 1 is a diagram showing how deblock filtering is selectively skipped according to similarities between adjacent image blocks.

FIG. 1 illustrates an image 12 that selectively filters blocking artifacts according to similarities between image blocks. It is to be understood that the image may likewise use non-square blocks or any other sets of pixels. The boarders between some of the blocks 14 include blocking artifacts 18. In general blocking artifacts are any image discontinuities between blocks 14 that may result from the encoding and/or decoding process. A low pass filter or other filter may be used to reduce the blocking artifacts that exist at the boarders of adjacent image blocks.

For example, blocking artifacts 24 exist between blocks 20 and 22. A low pass filter may be used at the boarder 26 between blocks 20 and 22 to remove or otherwise reduce the blocking artifacts 24. The low pass filter, for example, selects a group of pixels 28 from both sides of the boarder 26. An average pixel value, or any other statistical measure, is derived from the group of pixels 28. Then each individual pixel is compared to the average pixel value. Any pixels in group 28 outside of a predetermined range of the average pixel value is then replaced with the average pixel value.

As previously described, if there are few or no blocking artifacts 24 between the adjacent pixels, then the groups of pixels 28 may be needlessly filtered causing blurring in the image. A skip mode filtering scheme may use the motion estimation and/or compensation information for adjacent image blocks as a basis upon which to selectively filter. If the motion estimation and compensation information is sufficiently similar the filtering may be skipped. This avoids unnecessary image blurring and significantly reduces the required number of filtering operations, or any other appropriate value.

As an example, it may be determined during the encoding process that adjacent image blocks 30 and 32 have similar coding parameters. Accordingly, the deblock filtering may be skipped for the groups of pixels 34 that extend across the boarder 31 between adjacent blocks 30 and 32. Skip mode filtering can be used for any horizontal, vertical, or otherwise any boundary between adjacent blocks in the image 12.

Figure 2:
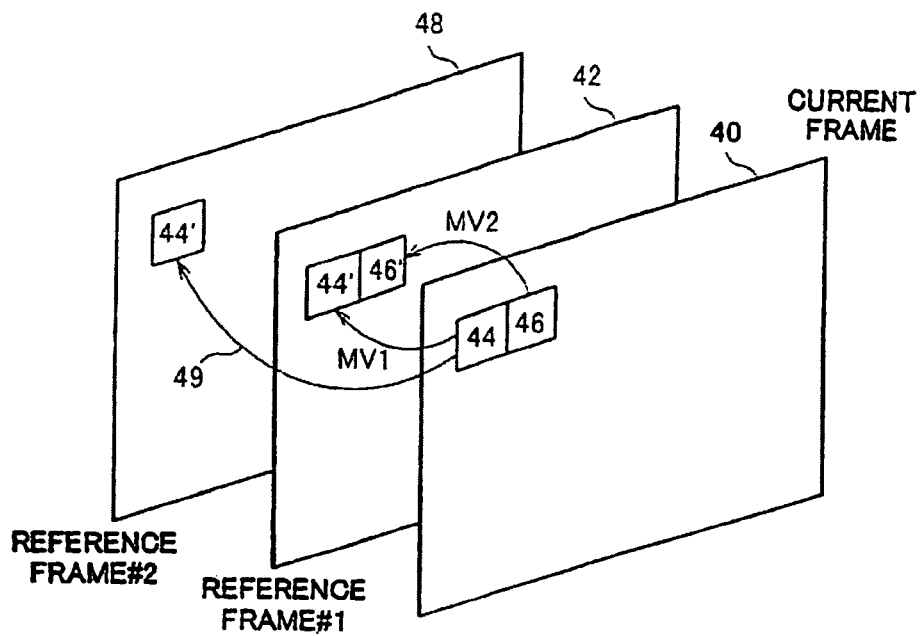
FIG. 2 is a diagram showing two adjacent image blocks having similar motion vectors.

FIG. 2 illustrates a reference frame 42, reference frame 48, and a current frame 40 that is currently being encoded or decoded. The coding parameters for blocks 44 and 46 are compared to determine whether the deblock filtering should be skipped between the two adjacent blocks 44 and 46. One of the encoding parameters that may be compared is the motion vectors (MV) for the blocks 44 and 46.

A motion vector MV1 points from block 44 in the current image frame 40 to an associated block 44' in the reference image 42. A motion vector MV2 points from block 46 in the current image frame 40 to an associated block 46' in the reference frame 42. A skip mode filtering checks to see if the motion vectors MV1 and MV2 point to adjacent blocks in the same reference frame 42. If the motion vectors point to adjacent blocks in the same reference frame (MV1=MV2), then the deblock filtering may be skipped. This motion vector information may be used along with other coding information to decide whether to skip deblock filtering between the two image blocks 44 and 46.

More than one reference frame may be used during the encoding and decoding process. For example, there may be another reference frame 48. The adjacent blocks 44 and 46 may have motion vectors pointing to different reference frames. In one example, the decision to skip deblock filtering depends on whether the motion vectors for the two adjacent blocks point to the same reference frame. For example, image block 44 may have a motion vector 49 pointing to reference frame 48 and image block 46 may have the motion vector MV2 pointing to reference frame 42. The deblock filtering is not skipped in this example because the motion vectors 49 and MV2 point to different reference frames.

Figure 3:
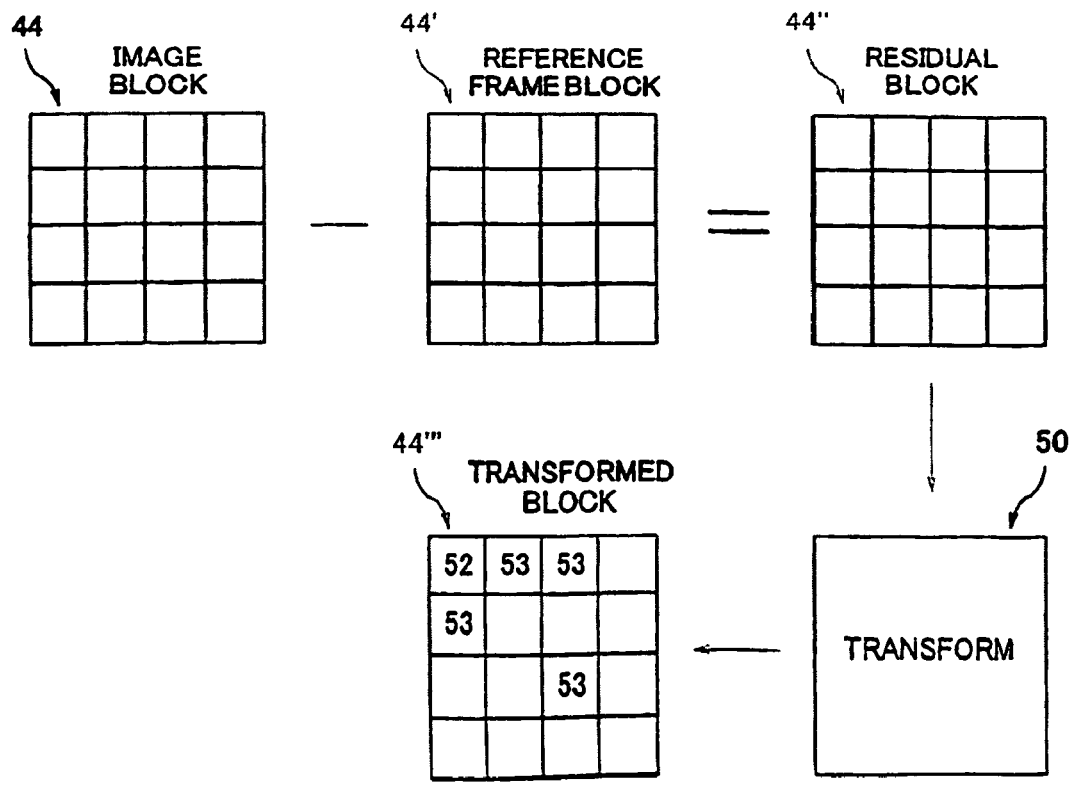
FIG. 3 is a diagram showing how transform coefficients are identified for one of the image blocks.

FIG. 3 illustrates another example of a coding parameter that may be used to decide whether or not to selectively skip deblock filtering. The image block 44 from image frame 40 is compared with reference block 44' from the reference frame 42 pointed to by the motion vector MV1 as previously illustrated in FIG. 2. A residual block 44" is output from the comparison between image block 44 and reference block 44'. A transform 50 is performed on the residual block 44" creating a transformed block 44'" of transform coefficients. In one example, the transform 50 is a Discrete Cosine Transform. The transformed block 44'" includes a D.C. components 52 and A.C. components 53.

The D.C. component 52 refers to a lowest frequency transform coefficient in image block 44. For example, the coefficient that represents the average energy in the image block 44. The A.C. components 53 refer to the transform coefficients that represent the higher frequency components in the image block 44. For example, the transform coefficients that represent the large energy differences between pixels in the image block 44.

Figure 4:
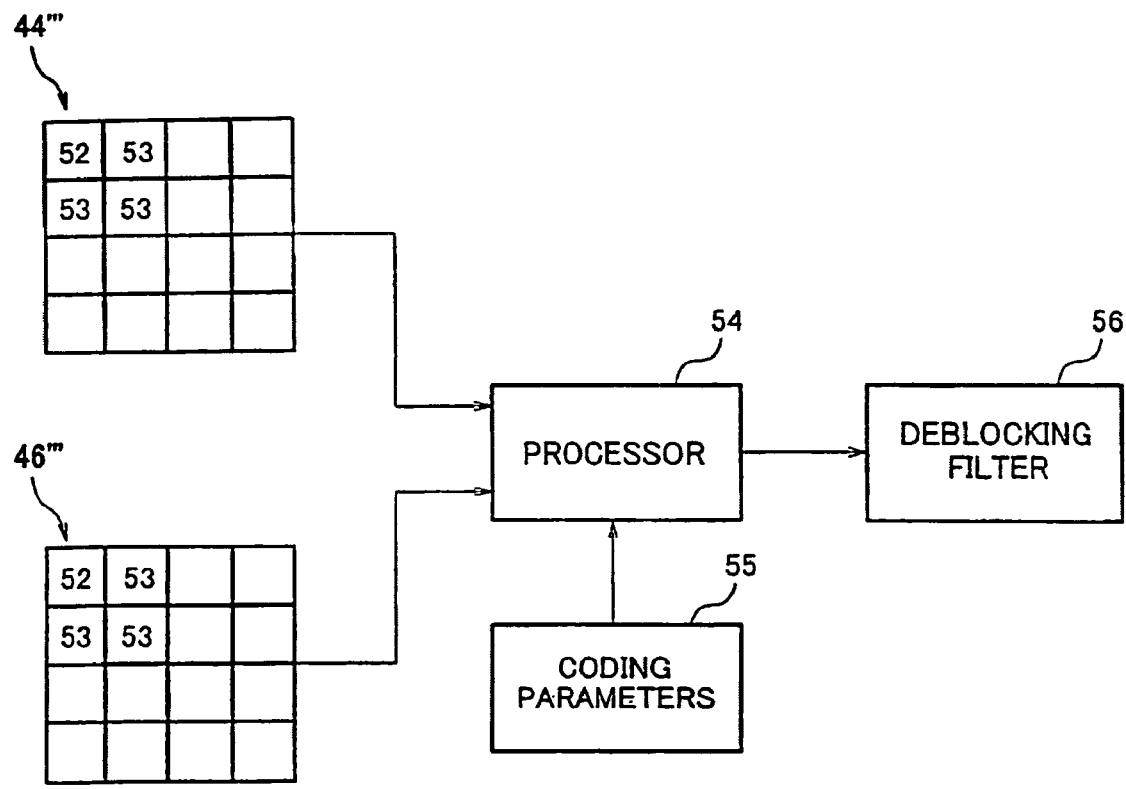
FIG. 4 is a diagram showing how residual transform coefficients are compared between two adjacent image blocks.

FIG. 4 illustrates the transformed residual blocks 44'" and 46'". The D.C. components 52 from the two transformed blocks 44'" and 46'" are compared in processor 54. If the D.C. components are the same or within some range of each other, the processor 54 notifies a deblock filter operation 56 to skip deblock filtering between the boarder of the two adjacent blocks 44 and 46. If the D.C. components 52 are not similar, then no skip notification is initiated and the boarder between blocks 44 and 46 is deblock filtered.

In one example, the skip mode filtering may be incorporated into the Telecommunications Sector of the International Telecommunication Union (ITU-T) proposed H.26L encoding scheme. The H.26L scheme uses 4×4 integer Discrete Cosine Transform (DCT) blocks. If desired, only the D.C. component of the two adjacent blocks may be checked. However some limited low frequency A.C. coefficients may likewise be checked, especially when the image blocks are larger sizes, such as 9×9 or 16×16 blocks. For example, the upper D.C. component 52 and the three lower frequency A.C. transform coefficients 53 for block 44'" maybe compared with the upper D.C. component 52 and three lower frequency A.C. transform coefficients 53 for block 46'". Different combinations of D.C. and/or any of the A.C. transform coefficients can be used to identify the relative similarity between the two adjacent blocks 44 and 46.

The processor 54 can also receive other coding parameters 55 that are generated during the coding process. These coding parameters include the motion vectors and reference frame information for the adjacent blocks 44 and 46 as previously described. The processor 54 may use some or all of these coding parameters to determine whether or not to skip deblock filtering between adjacent image blocks 44 and 46. Other encoding and transform functions performed on the image may be carried out in the same processor 54 or in a different processing circuit. In the case where all or most of the coding is done in the same processor, the skip mode is simply enabled by setting a skip parameter in the filtering routine.

Figure 5:
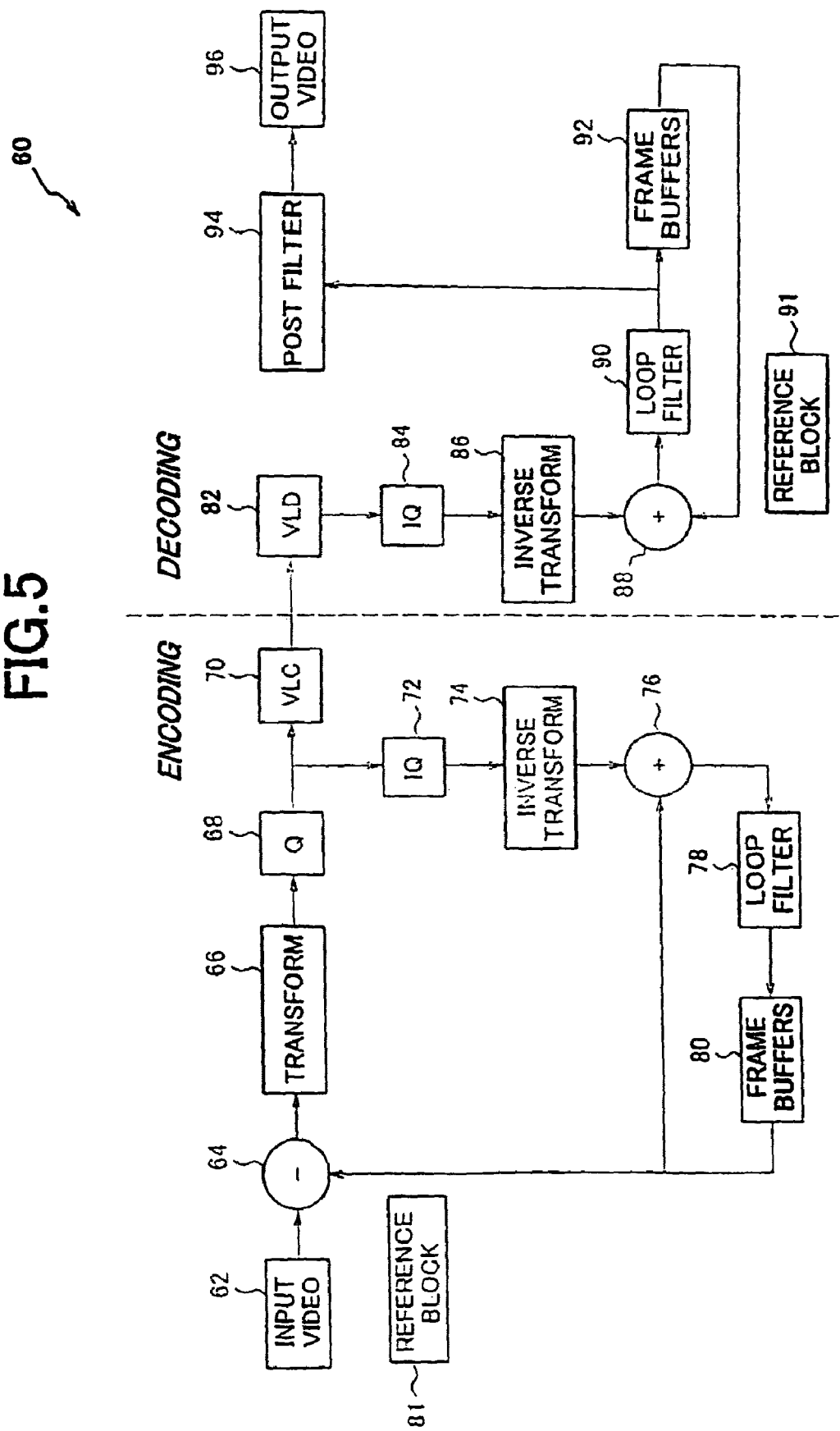
FIG. 5 is a block diagram showing how the video image is encoded and decoded.

FIG. 5 shows how skip mode filtering may be used in a block-based motion-compensated Coder-Decoder (Codec) 60. The codec 60 is used for inter-frame coding. An input video block from the current frame is fed from box 62 into a comparator 64. The output of a frame buffering box 80 generates a reference block 81 according to the estimated motion vector (and possible reference frame number). The difference between the input video block and the reference block 81 is transformed in box 66 and then quantized in box 68. The quantized transform block is encoded by a Variable Length Coder (VLC) in box 70 and then transmitted, stored, etc.

The encoding section of the codec 60 reconstructs the transformed and quantized image by first Inverse Quantizing (IQ) the transformed image in box 72. The inverse quantized image is then inverse transformed in box 74 to generate a reconstructed residual image. This reconstructed residual block is then added in box 76 to the reference block 81 to generate a reconstructed image block. Generally the reconstructed image is loop filtered in box 78 to reduce blocking artifacts caused by the quantization and transform process. The filtered image is then buffered in box 80 to form reference frames. The frame buffering in box 80 uses the reconstructed reference frames for motion estimation and compensation. The reference block 81 is compared to the input video block in comparator 64. An encoded image is output at node 71 from the encoding section and is then either stored or transmitted.

In a decoder portion of the codec 60, a variable length decoder (VLD) decodes the encoded image in box 82. The decoded image is inverse quantized in box 84 and inverse transformed in box 86. The reconstructed residual image from box 86 is added in the summing box 88 to the reference block 91 before being loop filtered in box 90 to reduce blocking artifacts and buffered in box 92 as reference frames. The reference block 91 is generated from box 92 according to the received motion vector information. The loop filtered output from box 90 can optionally be post filtered in box 94 to further reduce image artifacts before being displayed as, a video image in box 96. The skip mode filtering scheme can be performed in any combination of the filtering functions in boxes 78, 90 and 94.

The motion estimation and compensation information available during video coding are used to determine when to skip deblock filtering in boxes 78, 90 and/or 94. Since these coding parameters are already generated during the encoding and decoding process, there are no additional coding parameters that have to be generated or transmitted specially for skip mode filtering.

FIG. 6 shows is further detail how skip mode filtering may be used in the filters 78, 90, and/or 94 in the encoder and decoder in FIG. 5. The interblock boundary between any two adjacent blocks "j" and "k" is first identified in box 100. The two blocks may be horizontally or vertically adjacent in the image frame. Decision box 102 compares the motion vector mv(j) for block j with the motion vector mv(k) for block k. It is first determined whether the two adjacent blocks j and k have the same motion vector pointing to the same reference frame. In other words, the motion vectors for the adjacent blocks point to adjacent blocks (mv(j)=mv(k)) in the same reference frame (ref(j)=ref(k)).

It is then determined whether the residual coefficients for the two adjacent blocks are similar. If there is no significant difference between the image residuals of the adjacent blocks, for example, the two blocks j and k have the same of similar D.C. component (dc(j) dc(k)), then the deblock filtering process in box 104 is skipped. Skip mode filtering then moves to the next interblock boundary in box 106 and conducts the next comparison in decision box 102. Skip mode filtering can be performed for both horizontally adjacent blocks and vertically adjacent blocks.

In one embodiment, only the reference frame and motion vector information for the adjacent image blocks are used to determine block skipping. In another embodiment, only the D.C. and/or A.C. residual coefficients are used to determine block skipping. In another embodiment, the motion vector, reference frame and residual coefficients are all used to determine block skipping.

The skip mode filtering scheme can be applied to spatially subsampled chrominance channels. For example in a case with 4:2:0 color format sequences, skip mode filtering for block boundaries may only rely on the equality of motion vectors and D.C. components for the luminance component of the image. If the motion vectors and the D.C. components are the same, deblock filtering is skipped for both the luminance and chrominance components of the adjacent image blocks. In another embodiment, the motion vectors and the D.C. components are considered separately for each luminance and chrominance component of the adjacent blocks. In this case, a luminance or chrominance component for adjacent blocks may be deblock filtered while the other luminance or chrominance components for the same adjacent blocks are not deblock filtered.

Referring to FIG. 7, some known techniques define a "block strength" parameter for the loop filter to control the loop filtering process. Each block of an image has a strength value that is associated with the block and controls the filtering performed on all of its four block boundaries. The block strength value is derived based on the motion vectors and transform coefficients available in the bitstream. However, after consideration of the use of the block strength value for all four edges of the block, the present inventors came to the realization that this results in removing some blocking artifacts at some edges while unnecessarily blurring along other edges.

In contrast to the block by block manner of filtering, the present inventors came to the realization that filtering determinations should be made in an edge by edge manner together with other information. The other information, may include for example, intra-block encoding of blocks, motion estimation of blocks with residual information, motion estimation of blocks without residual information, and motion estimation of blocks without residuals having sufficient differences. One, two, three, or four of these information characteristics may be used to improved filtering abilities in an edge by edge manner. Based upon different sets of characteristics, the filtering may be modified, as desired.

Figure 8:
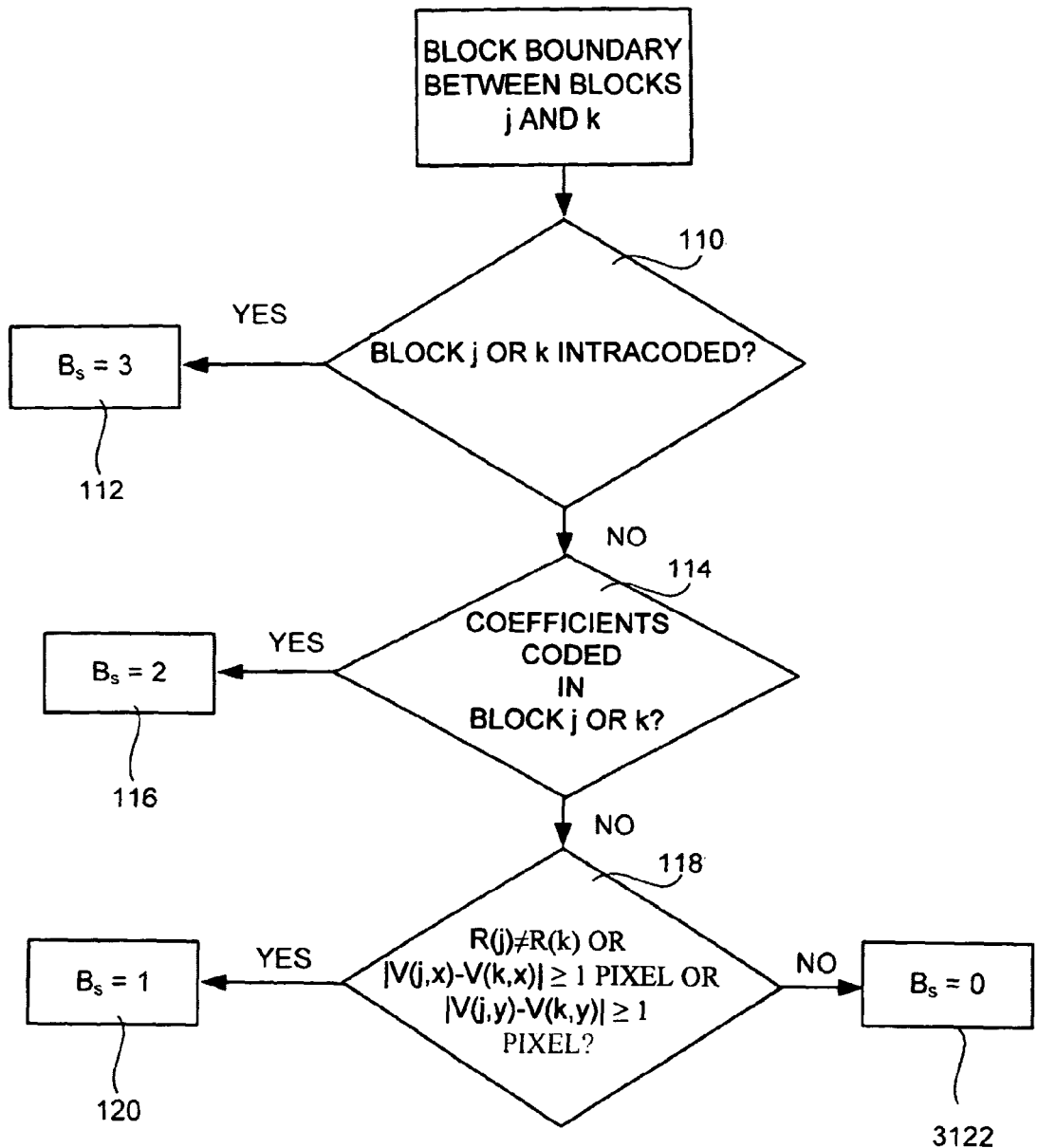
FIG. 8 is a block diagram showing a technique for determining the boundaries to filter and the strength of the respective filter to use.

For each block boundary a control parameter is preferably defined, namely, a boundary strength Bs. Referring to FIG. 8 a pair of blocks sharing a common boundary are referred to as j and k. A first block 110 checks to see if either one of the two blocks is intra-coded. If either is intra-coded, then the boundary strength is set to three at block 112. Block 110 determines if both of the blocks are not motion predicted. If no motion prediction is used, then the block derives from the frame itself and accordingly there should be filtering performed on the boundary. This is normally appropriate because intra-coded block boundaries normally include blocking artifacts.

If both of the blocks j and k are, at least in part, predicted from a previous or future frame, then the blocks j and k are checked at block 114 to determine if any coefficients are coded. The coefficients, may be for example, discrete cosine transform coefficients. If either of the blocks j and k include non-zero coefficients, then at least one of the blocks represent a prediction from a previous or future frame together with modifications to the block using the coefficients, generally referred to as residuals. If either of the blocks j and k include non-zero coefficients (and motion predicted) then the boundary strength is set to two at block 116. This represents an occurrence where the images are predicted but the prediction is corrected using a residual. Accordingly, the images are likely to include blocking artifacts.

If both of the blocks j and k are motion predicted and do not include non-zero coefficients, generally referred to as residuals, then a determination at block 118 is made to check if the pixels on either side of the boundary are sufficiently different from one another. This may likewise be used to determine if the residuals are sufficiently small. If a sufficient difference exists then a blocking artifact is likely to exist. Initially a determination is made to determine if the two blocks use different reference frames, namely, $R(j) \neq R(k)$. If the blocks j and k are from two different reference frames then the boundary strength is assigned a value of one at block 120. Alternatively, if the absolute difference of the motion vectors of the two image blocks is checked to determine if they are greater than or equal to 1 pixel in either vertical or horizontal directions, namely, $|V(j,x)-V(k,x)| \geq 1$ pixel or $|V(j,y)-V(k,y)| \geq 1$ pixel. Other threshold values may likewise be used, as desired, including less than or greater than depending on the test used. If the absolute difference of the motion vectors is greater than or equal to one then the boundary strength is assigned a value of one.

If the two blocks j and k are motion predicted, without residuals, are based upon the same frame, and have insignificant differences, then the boundary strength value is assigned a value of zero. If the boundary strength value is assigned a value of zero the boundary is not filtered or otherwise adaptively filtered accordingly to the value of the boundary strength. It is to be understood that the system may lightly filter if the boundary strength is zero, if desired.

The value of the boundary strength, namely, one, two, and three, is used to control the pixel value adaptation range in the loop filter. If desired, each different boundary strength may be the basis of a different filtering. For example, in some embodiments, three kinds of filters may be used wherein a first filter is used when Bs=1, a second filter is used when Bs=2 and a third filter is used when Bs=3. It is to be understood that non-filtering may be performed by minimal filtering in comparison to other filtering which results in a more significant difference. In the example shown in FIG. 8 the larger the value for Bs the greater the filtering. The filtering may be performed by any suitable technique, such as methods described in Joint Committee Draft (CD) of the Joint Video Team (JVT) of ISO/IEC MPEG and ITU-T VCEG (JVT-C167) or other known methods for filtering image artifacts.

Skip mode filtering can be used with any system that encodes or decodes multiple image frames. For example, DVD players, video recorders, or any system that transmits image data over a communications channel, such as over television channels or over the Internet. It is to be understood that the system may use the quantization parameter as a coding parameter, either alone or in combination with other coding parameters. In addition, it is to be understood that the system may be free from using the quantization parameter alone or free from using the quantization parameter at all for purposes of filtering.

The skip mode filtering described above can be implemented with dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

In some embodiments of the present invention as illustrated in FIG. 9, image data 902 may be input to an image data encoding apparatus 904 which includes the adaptive filtering portion as described above for some embodiments of the present invention. Output from the image data encoding apparatus 904 is an encoded image data and may then be stored on any computer-readable storage media 906. The storage media may include, but is not limited to, disc media, memory card media, or digital tape media. Storage media 906 may act as a short-term storage device. The encoded image data may be read from storage media 906 and decoded by an image data decoding apparatus 908 which includes the adaptive filtering portion as described above for some embodiments of the present invention. The decoded image data may be provided for output decoded image data 910 to a display or other device.

In some embodiments of the present invention, as illustrated in FIG. 10 image data 1002 may be encoded and the encoded image data may then be stored on storage media 1006 and image data decoding apparatus 1008 is the same as shown in FIG. 9. In FIG. 10, B's data encoding portion 1012 receives the value of the boundary strength B's for each block boundary and encoded by any data encoding method which includes DPCM, multi-value run-length coding, transform coding with loss-less feature and so on. The boundary strength B's may be generated as described in FIG. 8. The encoded boundary strength may then be stored on storage media 1006. In one example, the encoded boundary strength may be stored separately from the encoded image data. In other example, the encoded boundary strength and the encoded image data may be multiplexed before storing on the storage media 1006.

The encoded boundary strength may be read from the storage media 1006 and decoded by B's data decoding portion 1014 to input the decoded boundary strength to image data decoding apparatus 1008. When the decoded boundary strength is utilized in image data decoding apparatus 1008 to perform the adaptive filtering of the present invention, it may not be necessary to repeat the process described in FIG. 8 to generate boundary strength and this may save the processing power for the adaptive filtering.

In some embodiments of the present invention, as illustrated in FIG. 11 image data 1102 may be input to an image data encoding apparatus 1104 which includes the adaptive filtering portion as described above for some embodiments of the present invention. Output from the image data encoding apparatus 1104 is an encoded image data and may then be sent over a network, such as a LAN, WAN or the Internet 1106. The encoded image data may be received and decoded by an image decoding apparatus 1108 which also communicates with network 1106. The image data decoding apparatus 1108 includes the adaptive filtering portion as described above for some embodiments of the present invention. The decoded image data may be provided for output decoded image data 1110 to a display or other device.

In some embodiments of the present invention, as illustrated in FIG. 12, image data 1202 may be encoded and the encoded image data may then be sent over a network, such as a LAN, WAN or the Internet 1206. The basic procedure of image data encoding apparatus 1204 and image data decoding apparatus 1208 is the same as FIG. 11. In FIG. 12, B's data encoding portion 1212 receives the value of the boundary strength B's for each block and encoded by any date encoding method which includes DPCM, multi-value run-length coding, transform coding with loss-less features and so on. The boundary strength B's may be generated as described in FIG. 11. The encoded boundary strength may then be sent over the network 1206. In one example, the encoded boundary strength may be sent separately from the encoded image data. In other examples, the encoded boundary strength and the encoded image data may be multiplexed before sending over the network 1206.

The encoded boundary strength may be received from the network 1206 and decoded by B's data decoding portion 1214 to input the decoded boundary strength to image data decoding apparatus 1208 to perform the adaptive filtering of the present invention, it may not be necessary to repeat the process described in FIG. 11 to generate boundary strength and this may save the processing power for the adaptive filtering.

Figure 13:
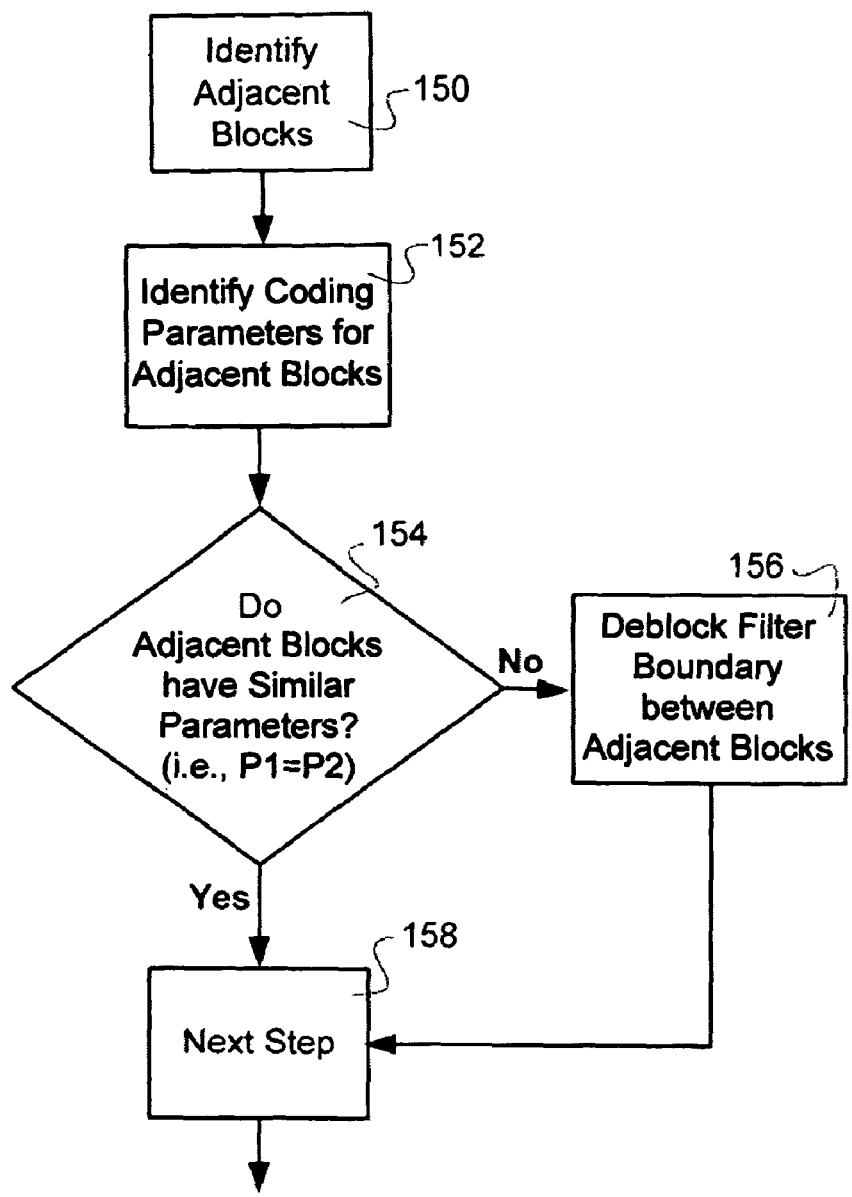
FIG. 13 is a flow chart describing the steps of an embodiment of the present invention in which deblock filtering between adjacent blocks is dependent on similarity of coding parameters in adjacent blocks.

Some embodiments of the present invention may be described with reference to FIG. 13. In these systems and methods, adjacent blocks 150 in a video frame are identified and coding parameters for these adjacent blocks are identified. The coding parameters for the adjacent blocks are then compared to determine their similarity 154. When the coding parameters are not similar, a deblock filter 156 is applied along the boundary between the adjacent blocks. When the coding parameters are similar, deblock filtering is skipped and the process proceeds to the next step 158. Likewise, when deblock filtering is performed, the process proceeds to the next step 158 after filtering.

Figure 14:
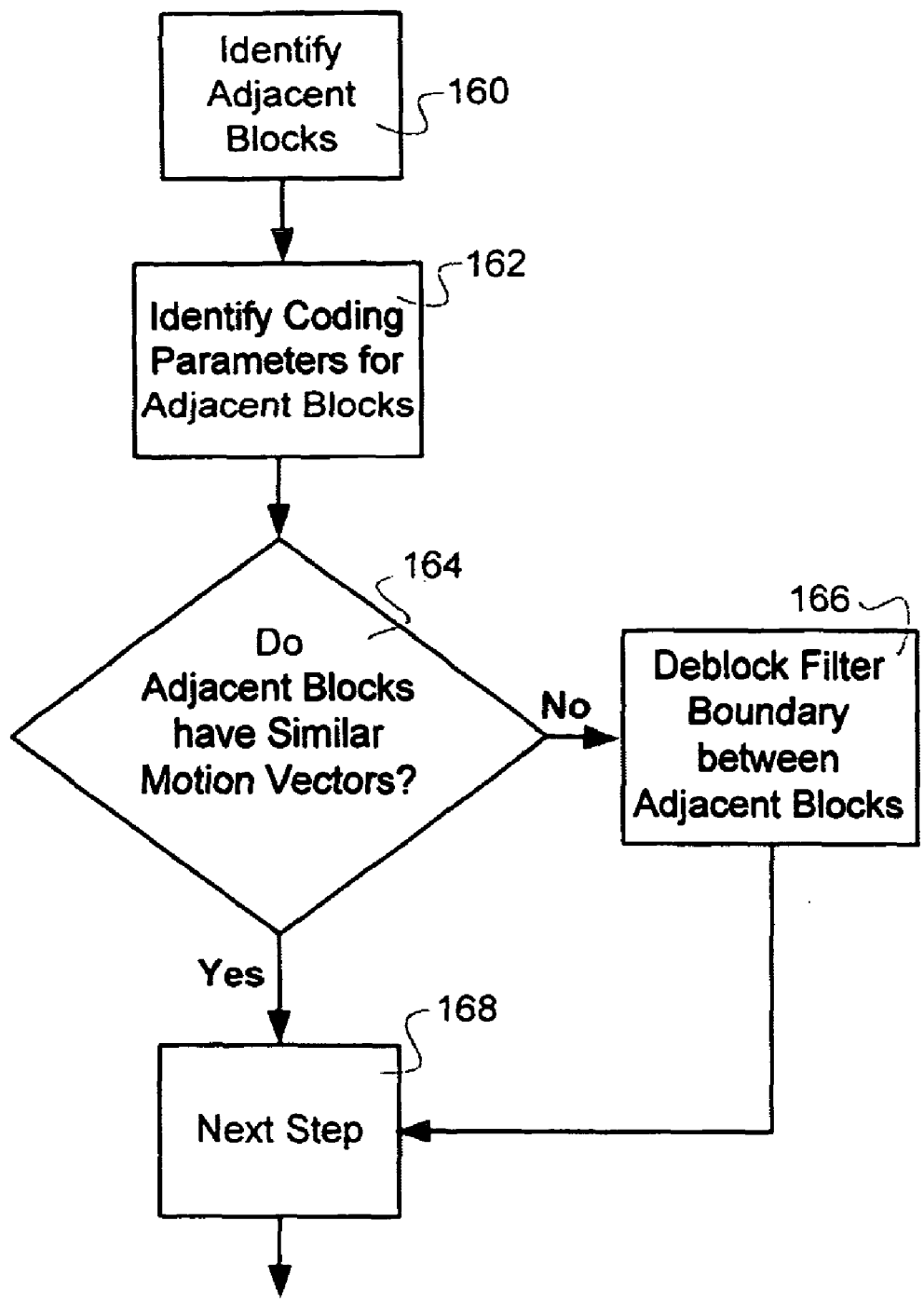
FIG. 14 is a flow chart describing the steps of an embodiment of the present invention in which deblock filtering between adjacent blocks is dependent on adjacent blocks having similar motion vectors.

In some embodiments of the present invention, as shown in FIG. 14, the coding parameters are motion vectors. In these embodiments, adjacent blocks in a video frame are identified 160 and coding parameters 162 comprising motion vectors are identified. These motion vectors are compared to determine their similarity 164. When the motion vectors are not similar, deblock filtering may be performed 166 between the adjacent blocks and the process may proceed to its next step 168. When the motion vectors are similar, deblock filtering is skipped and the next step 168 is accomplished directly.

Figure 15:
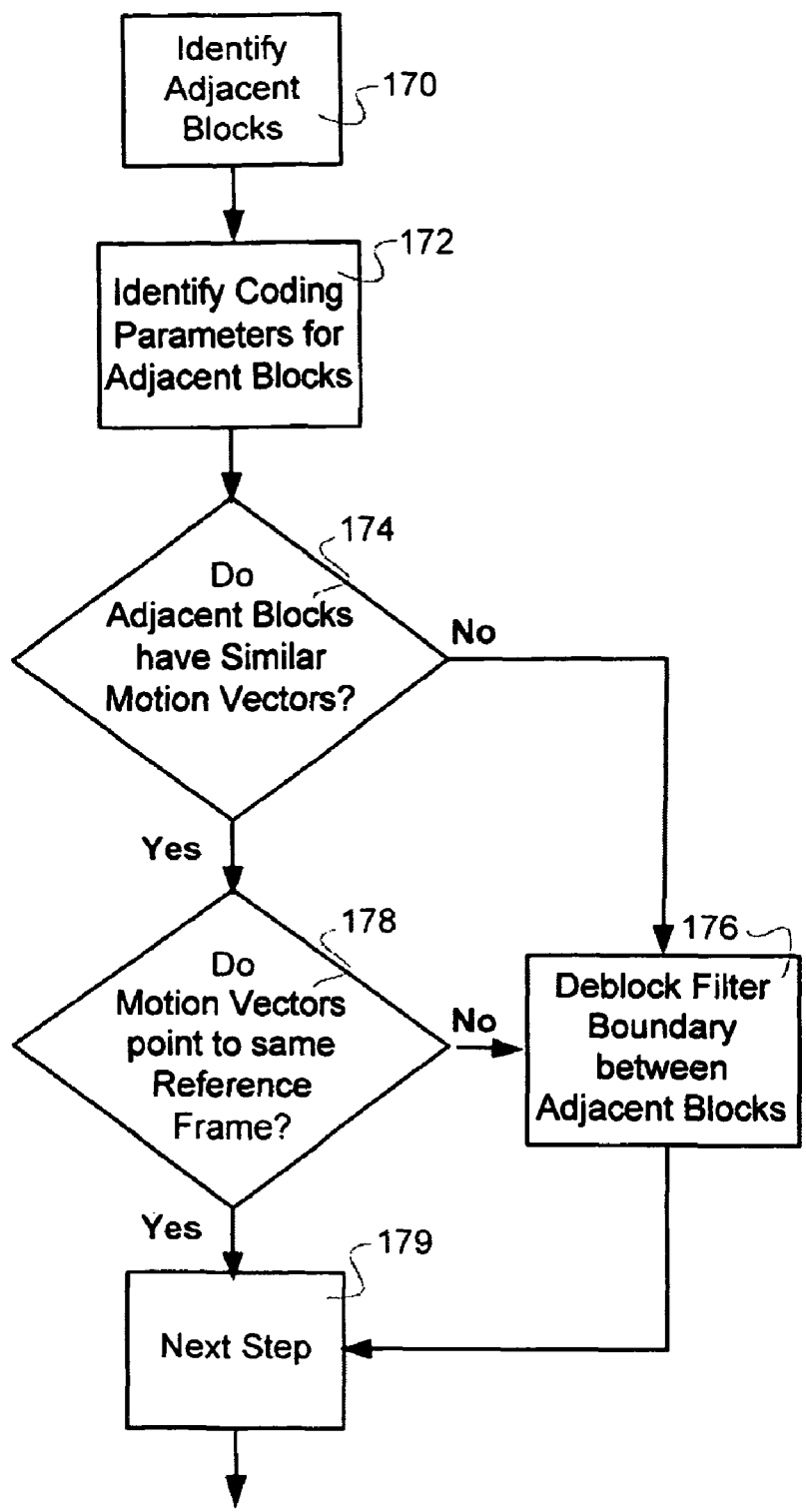
FIG. 15 is a flow chart describing the steps of an embodiment of the present invention in which deblock filtering between adjacent blocks is dependent on adjacent blocks having similar motion vectors that point to the same reference frame.

Other embodiments of the present invention, as shown in FIG. 15, may use multiple coding parameters to determine whether to skip filtering. In these embodiments, adjacent blocks are identified 170 and coding parameters 172 are determined for the adjacent blocks. These coding parameters may comprise motion vector attributes including the target frame of the motion vectors. When motion vectors of adjacent blocks are not similar 174, deblock filtering may be performed 176 between the adjacent blocks. When motion vectors are similar 174, other parameters may be used to further qualify the filtering process. In this example, the motion vectors may be compared to determine whether they point to the same reference frame 178. If the vectors do not point to the same reference frame, deblock filtering may be performed between the blocks 176. If the vectors point to the same reference frame, filtering may be skipped and the process may proceed to the next step 179.

Figure 16:
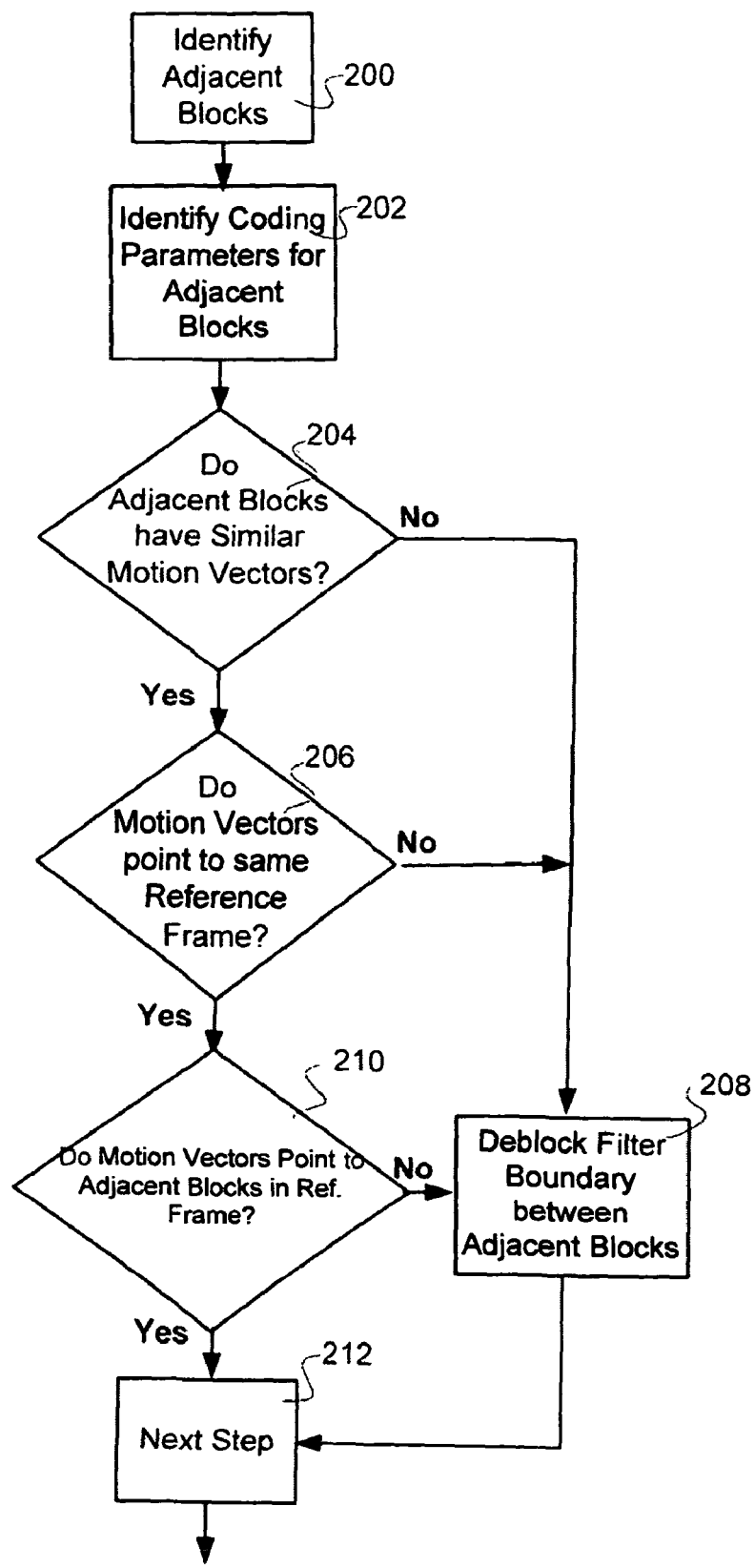
FIG. 16 is a flow chart describing the steps of an embodiment of the present invention in which deblock filtering between adjacent blocks is dependent on adjacent blocks having similar motion vectors that point to adjacent reference blocks in a single reference frame.

Further motion vector parameters may be used to determine filtering. In embodiments illustrated in FIG. 16, the location of the blocks to which vectors point is a parameter that may be used to determine filtering options. In these embodiments, adjacent blocks are identified 200 and coding parameters are identified for the adjacent blocks 202. Motion vectors are then compared to determine their similarity 204. If the vectors are not similar, deblock filtering may proceed 208. If motion vectors are similar, another comparison may be made to determine whether the motion vectors of the adjacent blocks point to the same reference frame. If the vectors don't point to the same frame, deblock filtering may proceed 208. If the vectors do point to the same reference frame, the blocks to which the vectors point may be compared 210. When motion vectors do not point to adjacent blocks in the same reference frame, deblock filtering may proceed 208. When the vectors point to adjacent blocks in the same reference frame, deblock filtering may be skipped and a next step 212 may be executed. In this manner, adjacent blocks which reference adjacent blocks in a reference frame and which are not likely to have significant artifacts therebetween are not deblock filtered. This deblock filter skipping avoids any blurring and image degradation caused by the filtering process. Processing time is also conserved as unnecessary filtering is avoided. Image quality is thereby improved and fewer calculations are required in the process. It should be noted that various combinations of these motion vector parameters may be used to determine filter skipping. These myriad combinations are not specifically described in detail, but are thought to be within the grasp of one skilled in the art and are intended to fall within the scope of the appended claims.

Further embodiments of the present invention may utilize transform coefficients to determine whether deblock filtering should occur. In reference to FIG. 17, adjacent blocks 180 in a frame are identified and coding parameters are identified for the adjacent blocks 182. These coding parameters may comprise motion vector parameters as well as transform coefficients.

Motion vectors are then compared 184 to determine similarity. If the motion vectors are not similar, deblock filtering may be performed 186. If the motion vectors are similar, the motion vector data is analyzed to determine whether the motion vectors point to the same reference frame. If the motion vectors do not point to the same reference frame 185, filtering may proceed 186.

If the motion vectors point to the same reference frame 185, transform coefficients may be compared to further qualify filtering processes. In this example, DC transform coefficients obtained through Discrete Cosine Transform (DCT) methods or other methods may be compared for the adjacent blocks. If the DC transform coefficients are not similar 187, deblock filtering may be performed 186. If the DC transform coefficients are similar, filtering may be skipped and the methods and systems may proceed to the next step 188.

Figure 17:
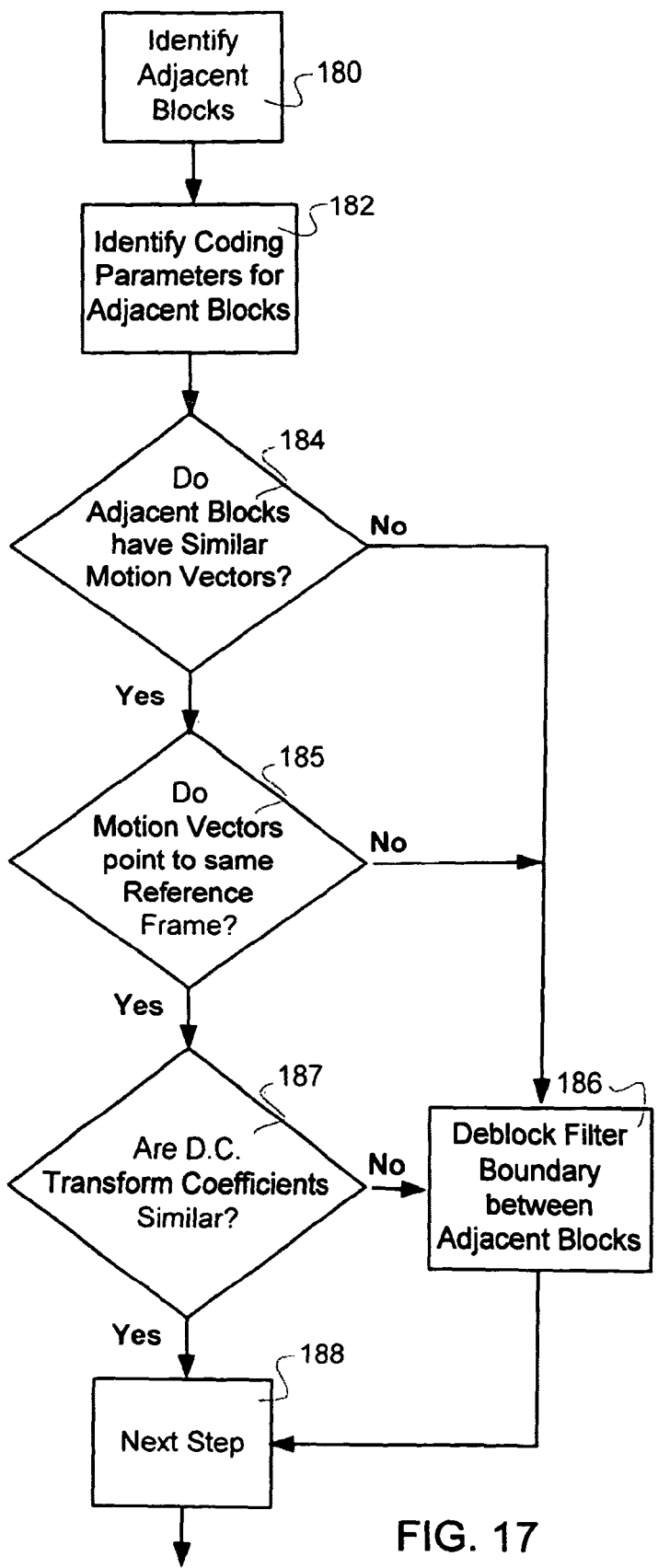
FIG. 17 is a flow chart describing the steps of an embodiment of the present invention in which deblock filtering between adjacent blocks is dependent on adjacent blocks having parameters comprising similar D.C. transform coefficients.
Figure 18:
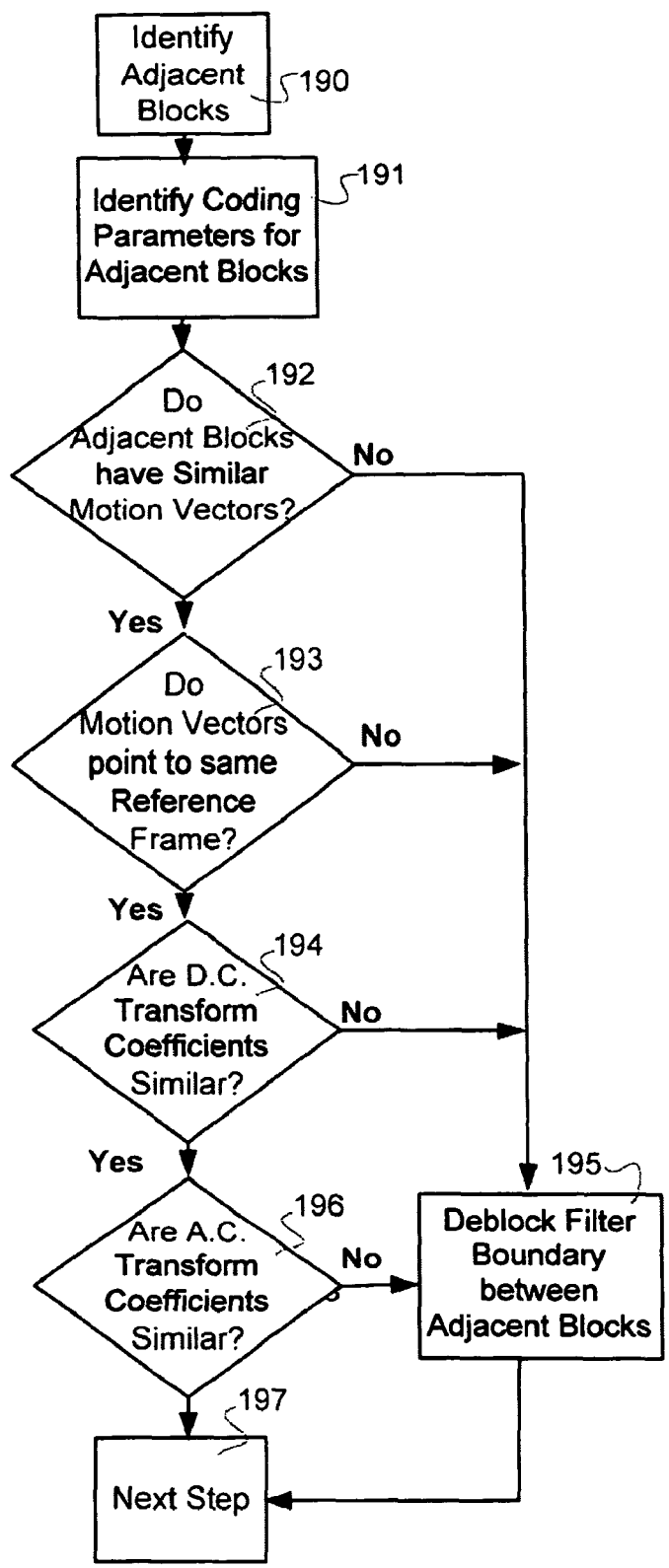
FIG. 18 is a flow chart describing the steps of an embodiment of the present invention in which deblock filtering between adjacent blocks is dependent on adjacent blocks having parameters comprising similar A.C. transform coefficients.

Still other embodiments of the present invention may utilize AC transform coefficients to determine filtering options. In reference to FIG. 18, embodiments similar to those described in relation to FIG. 17 are illustrated with the additional steps of evaluating AC transform coefficients. In these embodiments, blocks 190 and their coding parameters 191 are identified. Similarities in motion vectors 192, motion vector target frames 193 and DC transform coefficients are also compared 194. When similarities in these parameters exist, AC transform coefficients are compared 196 and, if they are similar, deblock filtering is skipped and the next step in the process is executed 197. If the AC coefficients are not similar, filtering is performed between the adjacent blocks and the process proceeds on to the next step 197.

AC transform coefficients are more likely to have significance in larger blocks, but can be used in methods utilizing smaller blocks such as 4×4 blocks.

In some embodiments of the present invention, an image may be separated into various luminance and chrominance channels depending on the format of the image and the color space utilized. In the following examples, a YUV color space is described, however, many other formats and color spaces may be used in these embodiments. CieLAB, YcrCb and other spaces may be used. In alternative embodiments color spaces such as RGB may be used.

Figure 19:
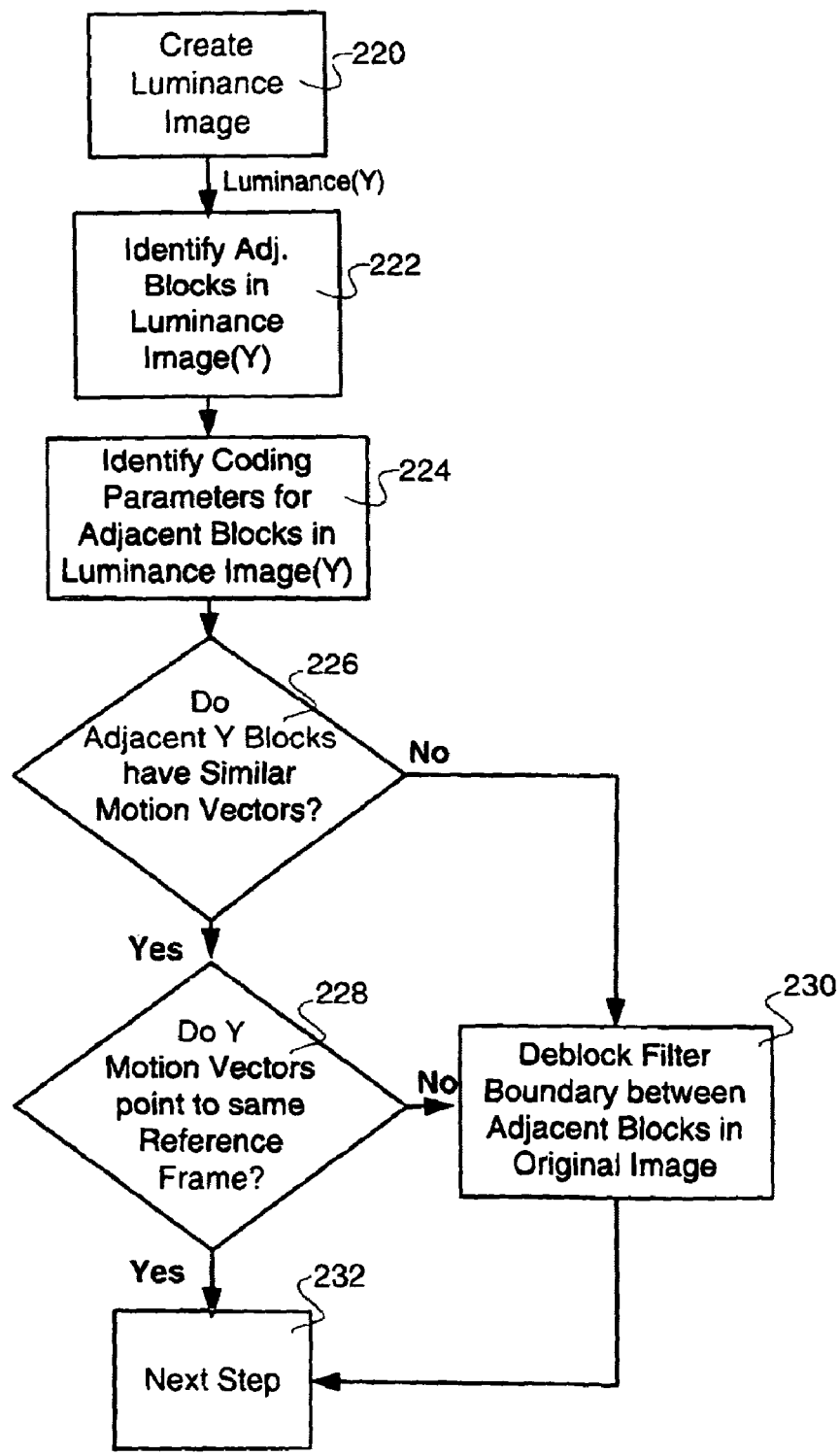
FIG. 19 is a flow chart describing the steps of an embodiment of the present invention in which deblock filtering between adjacent blocks is dependent on adjacent blocks in a luminance image having parameters comprising similar motion vectors and similar motion vector targets in a reference frame.

Some embodiments of the present invention may be described in relation to FIG. 19. In these embodiments, luminance data is extracted from the image and a luminance image is created 220. Adjacent blocks are then identified in the luminance image 222 and coding parameters for the adjacent blocks are also identified 224. As in other embodiments, the motion vectors of the adjacent blocks are compared to determine similarities 226. When the motion vectors are not similar, deblock filtering is performed 230, when the vectors are similar further analysis is performed to determine whether the vectors point to the same reference frame 228. When the vectors point to different reference frames, deblock filtering is performed between the adjacent blocks 230 of the original image that correspond to the adjacent blocks in the luminance image. When the vectors point to the same frame, deblock filtering is skipped and the next step is executed without prior filtering 232. When filtering is performed, the next step is executed 232 after the filtering processes. Accordingly, analysis of data in the luminance channel is used to determine filtering processes in the original image, which contains both luminance and chrominance data.

Figure 20:
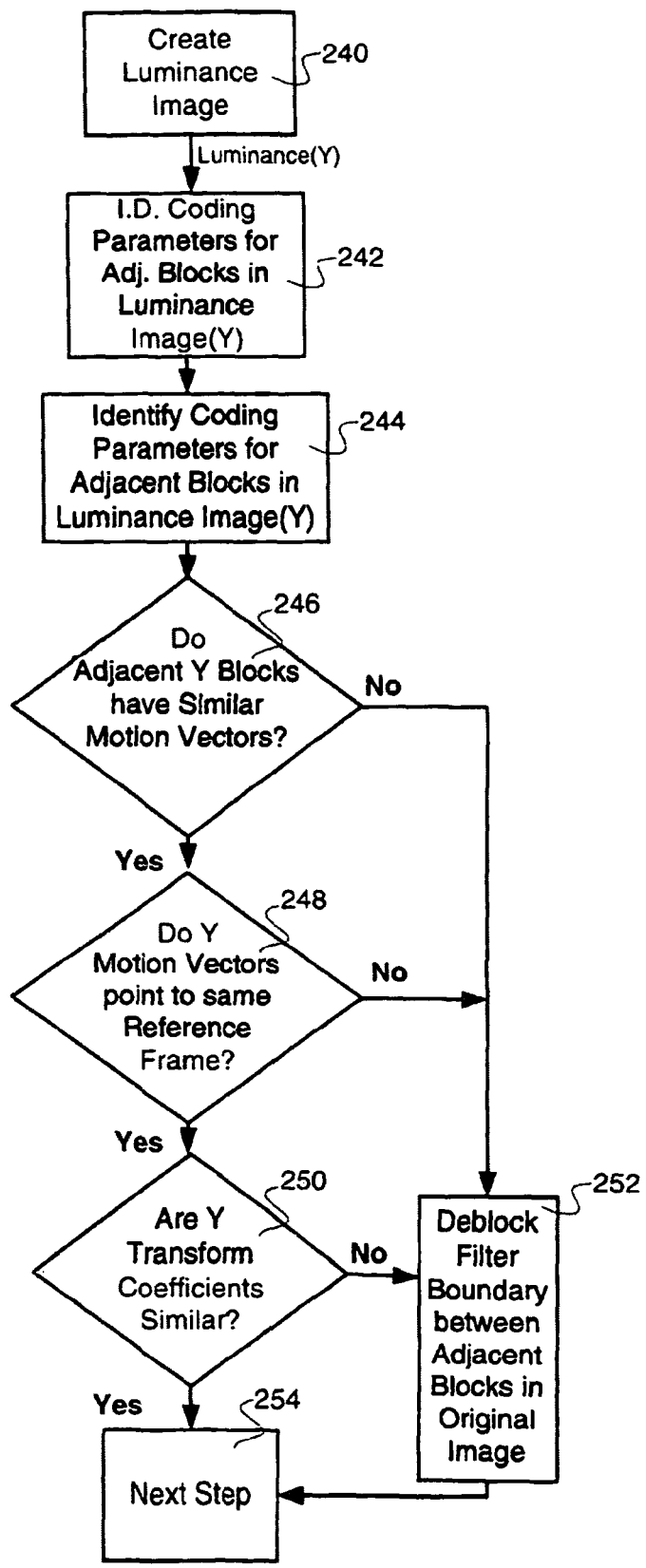
FIG. 20 is a flow chart describing the steps of an embodiment of the present invention in which deblock filtering between adjacent blocks is dependent on adjacent blocks in a luminance image having parameters comprising similar motion vectors, similar motion vector targets in a reference frame and similar transform coefficients.

In other related embodiments, illustrated in FIG. 20, a luminance image is created 240 and corresponding adjacent blocks are identified in the luminance and original image 242. Coding parameters are also identified for the luminance image blocks 244. Subsequently, motion vectors are compared to determine similarities 246. If significant similarities do not exist, filtering is performed between the adjacent blocks in the original image 252. If motion vectors are similar, the target frames of the motion vectors are compared to determine whether the vectors point to the same reference frame. If the vectors do not point to the same reference frame, filtering is performed. If the vectors point to the same reference frame, transform coefficients of the luminance (Y) image are compared. If Y transform coefficients are not similar, filtering is performed. If transform coefficients are similar, filtering is skipped and the next step 254 is executed. Likewise, the next step is executed 254 after any filtering operation.

Images may be further divided into component channels that generally correspond to luminance and chrominance channels. In some embodiments of the present invention, each channel may be filtered according to parameters unique to that channel.

Figure 21:
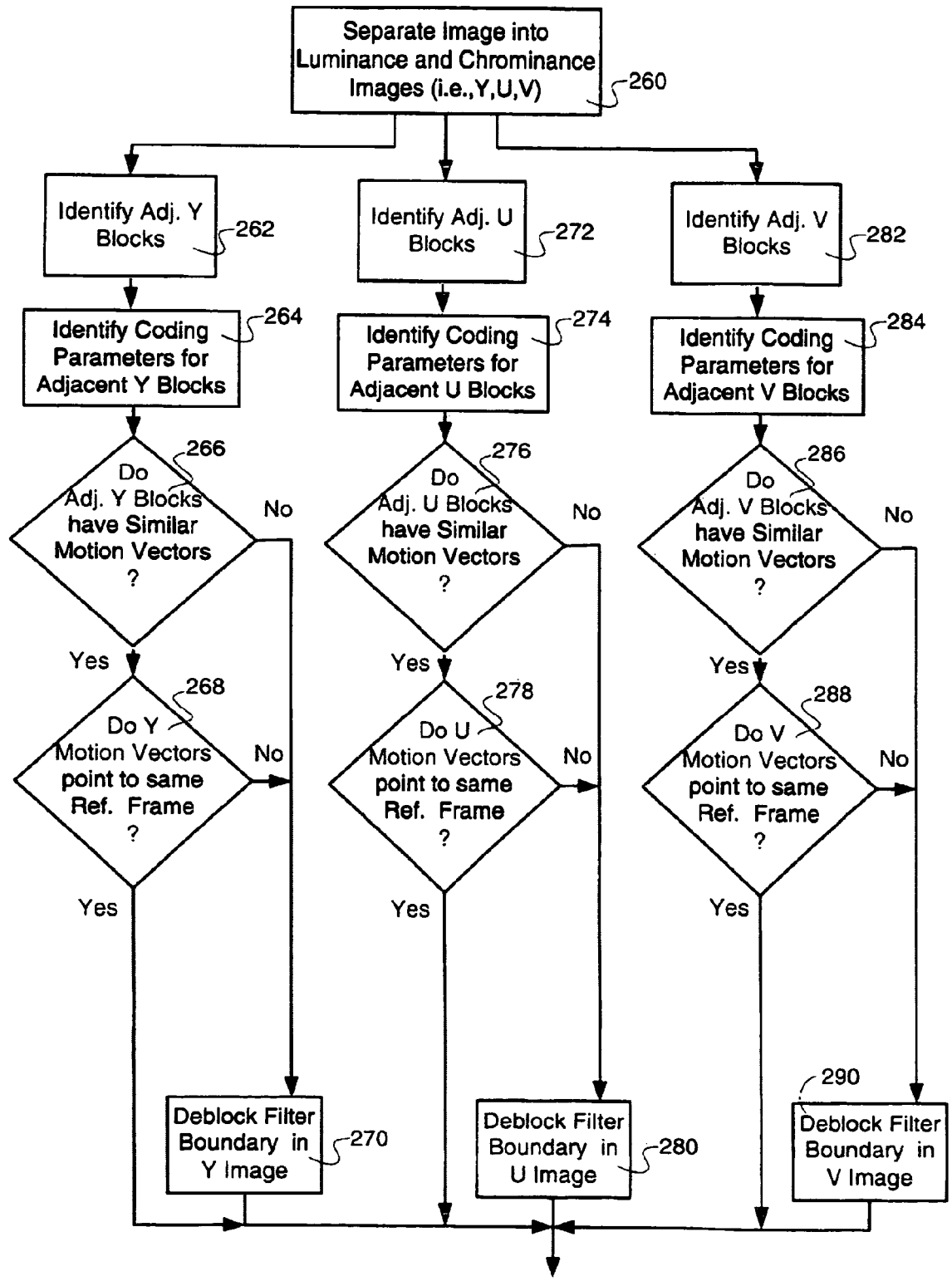
FIG. 21 is a flow chart describing the steps of an embodiment of the present invention in which an image is split into separate luminance and chrominance channels and deblock filtering between adjacent blocks in each luminance or chrominance image is dependent on adjacent blocks in a luminance image having parameters comprising similar motion vectors.

As an example, embodiments may be described with reference to FIG. 21, wherein an image is divided into separate luminance (Y) and multiple chrominance (U, V) channels 260. In these embodiments adjacent blocks are identified in images corresponding to each channel 262, 272, 282. Coding parameters, such as motion vectors data, are also identified for these blocks in each channel 264, 274, 284. These coding parameters may then be compared to determine similarities as in other embodiments. In these exemplary embodiments, motion vector similarities for channel-specific motion vectors may be used to determine filtering options in each channel. When the motion vectors for a channel image are not similar 266, 276, 286, filtering is performed in that specific channel between the adjacent blocks 270, 280, 290. If the motion vectors are similar, the target reference frames are compared 268, 278, 288. When the vectors for adjacent blocks in a channel point to the same reference frame, filtering is skipped. When the vectors point to different reference frames filtering is performed 270, 280, 290.

Figure 22:
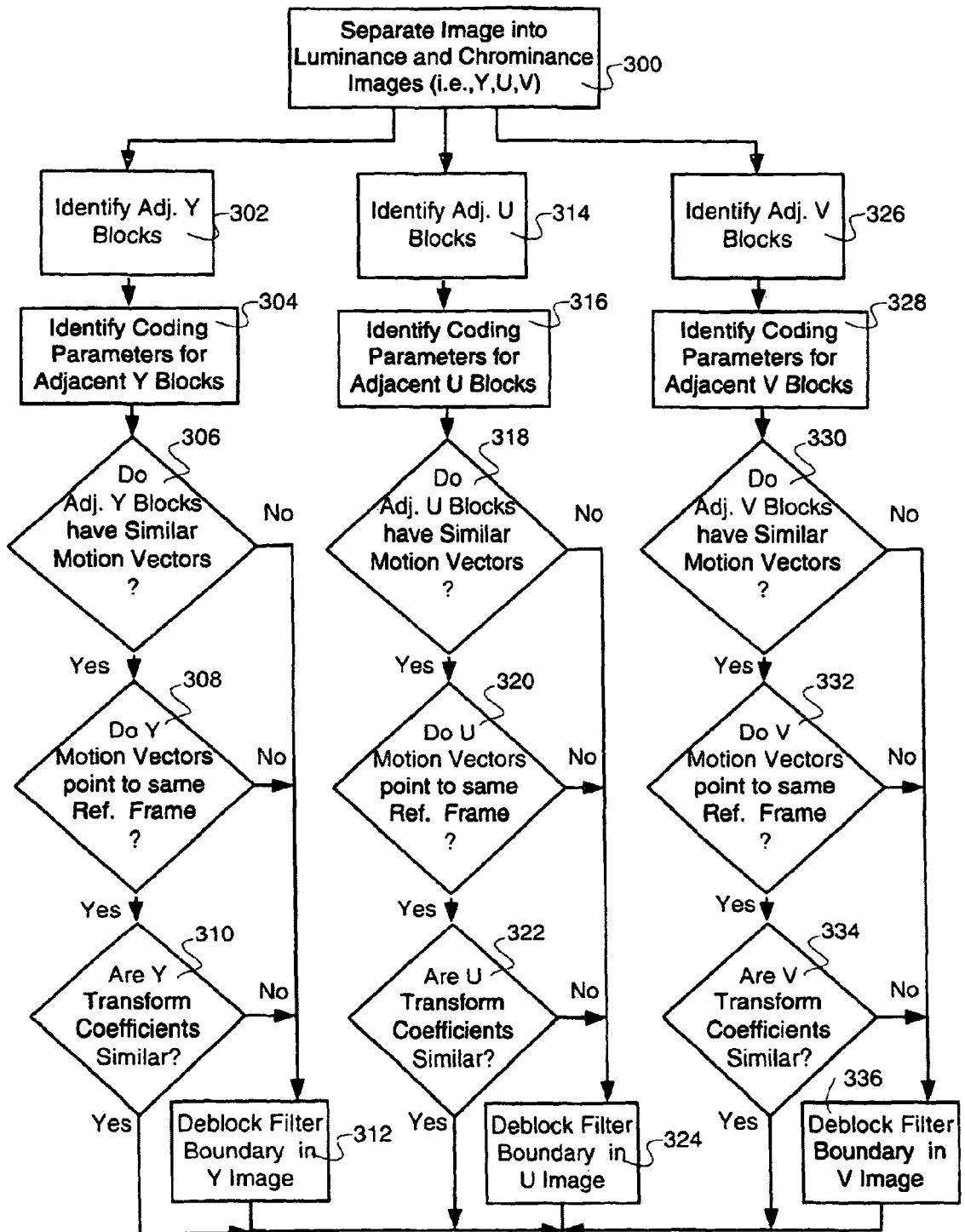
FIG. 22 is a flow chart describing the steps of an embodiment of the present invention in which an image is split into separate luminance and chrominance channels and deblock filtering between adjacent blocks in each luminance or chrominance image is dependent on adjacent blocks in a luminance image having parameters comprising similar motion vectors, similar motion vector targets in a reference frame and similar transform coefficients.

As in other embodiments, these channelized embodiments may utilize transform coefficient data to qualify filtering options. As shown in FIG. 22, the methods and systems described in relation to FIG. 21 may further compare channel transform coefficients 310, 322, 334. When the coefficients are not similar, filtering is performed 312, 324, 336. When the coefficients are similar, filtering is skipped.

It should be noted that various combinations of parameters may be employed in qualifying filtering operations in each channel. DC and AC transform coefficients may be utilized for these embodiments. Furthermore, various channels and combinations of channels may be used to determine filtering options and perform filtering. For example, both chrominance channels may be combined and analyzed together in some embodiments. Data and parameters from one channel may also be used to determine filtering options in another channel. For example, parameters taken from the U chrominance channel may be compared to determine filtering options in the V chrominance channel and vice versa.

Some embodiments of the present invention relate to the Scalable Video Coding Extension of H.264/AVC. Some embodiments relate to filtering to address a problem of picture upsampling for spatial scalable video coding. More specifically, some embodiments of the present invention provide an upsampling procedure that is designed for the Scalable Video Coding extension of H.264/MPEG-4 AVC, especially for the Extended Spatial Scalable (ESS) video coding feature adopted in April 2005 by JVT (Joint Video Team of MPEG and VCEG).

Currently, JSVM WD-1.0 [MPEG Doc. N6901], which is incorporated by reference herein, only addresses dyadic spatial scalability, that is, configurations where the ratio between picture width and height (in terms of number of pixels) of two successive spatial layers equals 2. This obviously will be a limitation on more general applications, such as SD to HD scalability for broadcasting.

A tool has been proposed, [MPEG Doc. m11669], which is incorporated by reference herein, that provides extended spatial scalability, that is, managing configurations in which the ratio between picture width and height of two successive spatial layers is not necessarily equal to a power of 2 and pictures of a higher level can contain regions (typically around picture borders) that are not present in corresponding pictures of a lower level. This proposal [MPEG Doc. m11669] extended inter-layer prediction of WD-1.0 [MPEG Doc. N6901] for more generic cases where the ratio between the higher layer and lower layer picture dimensions is not a power of 2.

Embodiments of the present invention provide a method that applies the extended spatial scalability, i.e., non-dyadic scaling with cropping window, to picture level that will better fit the need of more general applications. To support the picture-level adaptation of spatial scalability, embodiments of the present invention provide a further refinement of the inter-layer prediction method heretofore proposed. Additionally, several issues that were not addressed by the prior proposal are also addressed in these embodiments.

For the purposes of this specification and claims, the term "picture" may comprise an array of pixels, a digital image, a subdivision of a digital image, a data channel of a digital image or another representation of image data.

Figure 23:
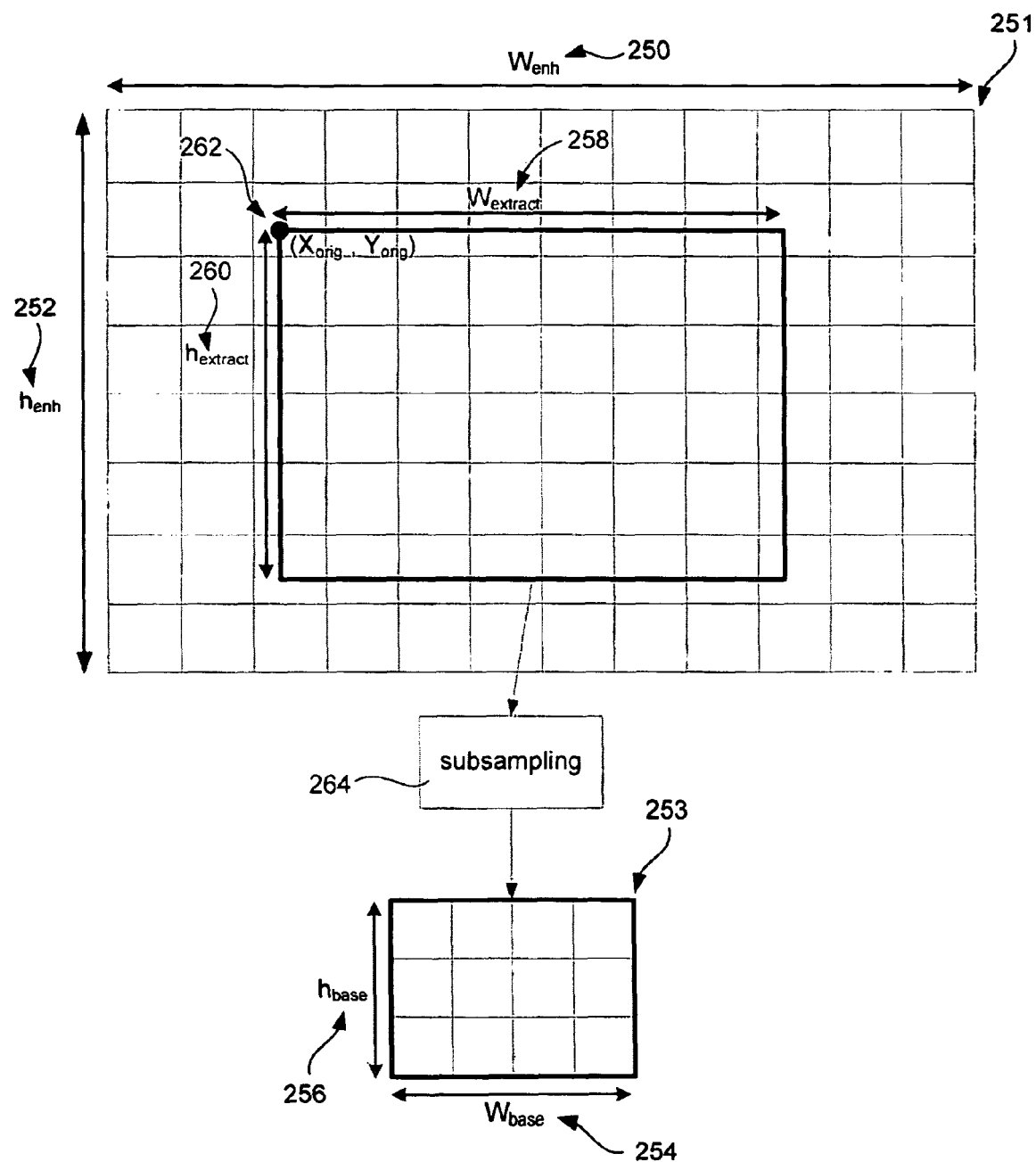
FIG. 23 is a diagram showing the geometric relationship between a base spatial layer and an enhancement spatial layer in some embodiments of the present invention.

FIG. 23 shows two pictures corresponding to an image picture.

Embodiments of the present invention relate to two or more successive spatial layers, a lower layer (considered as base layer) 253 and a higher layer (considered as enhancement layer) 251. These layers may be linked by the following geometrical relations (shown in FIG. 1). Width 250 and height 252 of enhancement layer pictures may be defined as $w_{enh}$ and $h_{enh}$, respectively. In the same way, dimensions of a base layer picture may be defined as $w_{base}$ 254 and $h_{base}$ 256. The base layer 253 may be a subsampled 264 version of a sub-region of an enhancement layer picture 251, of dimensions $w_{extract}$ 258 and $h_{extract}$ 260, positioned at coordinates 262 ($x_{orig}$, $y_{orig}$) in the enhancement layer picture coordinate system. Parameters ($x_{orig}$, $y_{orig}$, $w_{extract}$, $h_{extract}$, $w_{base}$, $h_{base}$) define the geometrical relations between a higher layer picture 251 and a lower layer picture 253.

Figure 24:
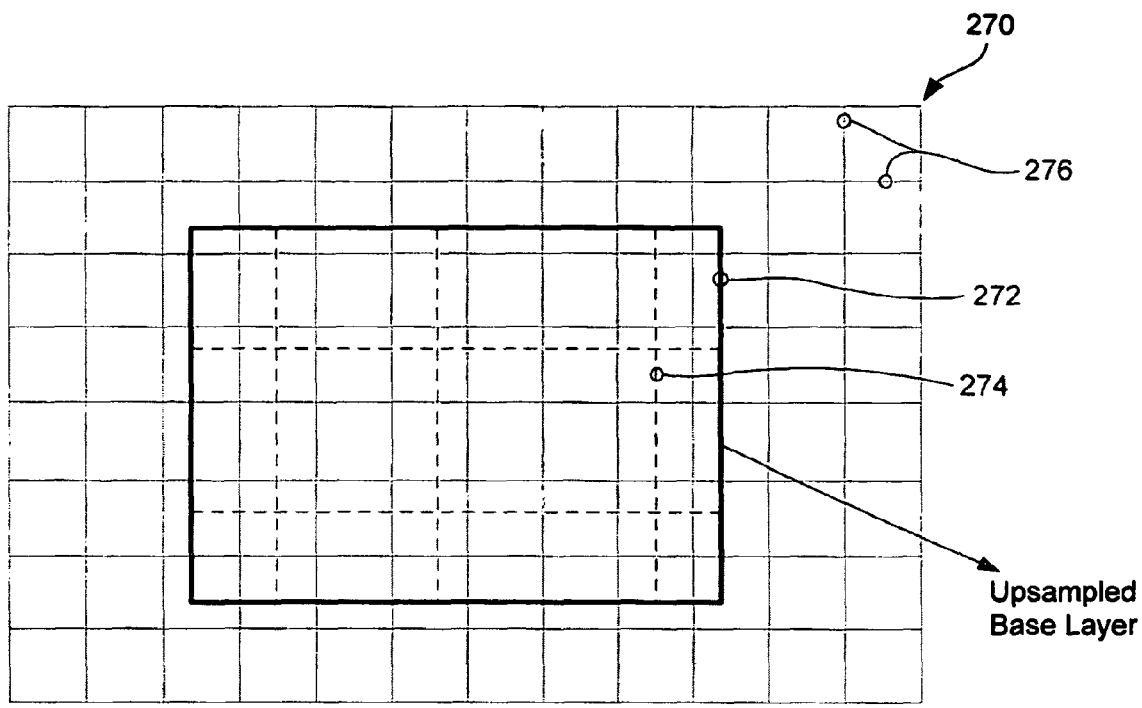
FIG. 24 is a diagram showing the geometric relationship between an upsampled base layer picture and an enhancement layer picture of some embodiments of the present invention.

A problem addressed by embodiments of the present invention is the encoding/decoding of macroblocks of the enhancement layer knowing the decoded base layer. A macroblock of an enhancement layer may have either no base layer corresponding block (on borders of the enhancement layer picture) or one to several base layer corresponding macroblocks, as illustrated in FIG. 24. Consequently, a different managing of the inter layer prediction than in WD-1.0 [MPEG Doc. N6901] is necessary. FIG. 2 illustrates macroblock overlapping between an upsampled base layer picture 272, wherein macroblock boundaries are marked by dashed lines 274 and an enhancement layer picture 270, wherein macroblock boundaries are marked by solid lines 276.

It has been proposed that [MPEG Doc. m11669], $w_{extract}$ and $h_{extract}$ be constrained to be a multiple of 16. This constraint limits the picture-level adaptation. Instead, embodiments of the present invention restrict $w_{extract}$ and $h_{extract}$ to be a multiple of 2. Embodiments of the present invention may further require $x_{orig}$ and $y_{orig}$ to be a multiple of 2 in order to avoid the complexity in adjusting for possible phase shift in chroma up/down sampling. The chroma-phase shift problem has not been previously addressed.

The dimensions and other parameters illustrated in FIG. 23 may be represented by the following symbols or variable names.

scaled_base_left_offset=$x_{orig}$
scaled_base_top_offset=$y_{orig}$
scaled_base_right_offset=$w_{enh}$-$x_{orig}$-$w_{extract}$
scaled_base_bottom_offset=$h_{enh}$-$y_{orig}$-$h_{extract}$
scaled_base_width=$w_{extract}$
scaled_base_height=$h_{extract}$ Inter-Layer Motion Prediction A given high layer macroblock can exploit inter-layer prediction using scaled base layer motion data using either "BASE_LAYER_MODE" or "QPEL_REFINEMENT_MODE". As in WD-1.0 [MPEG Doc. N6901], these macroblock modes indicate that the motion/prediction information including macroblock partitioning is directly derived from the base layer. A prediction macroblock, MB_pred, can be constructed by inheriting motion data from a base layer. When using "BASE_LAYER_MODE", the macroblock partitioning, as well as the reference indices and motion vectors, are those of the prediction macroblock MB_pred. "QPEL_REFINEMENT_MODE" is similar, but with a quarter-sample motion vector refinement.

It has been proposed to derive MB_pred in the following four steps:
for each 4×4 block of MB_pred, inheritance of motion data from the base layer motion data,
partitioning choice for each 8×8 block of MB_pred,
mode choice for MB_pred, and
motion vector scaling.

However, embodiments of the present invention provide modifications in several equations to support picture-level adaptation.

4×4 Block Inheritance

Figure 25:
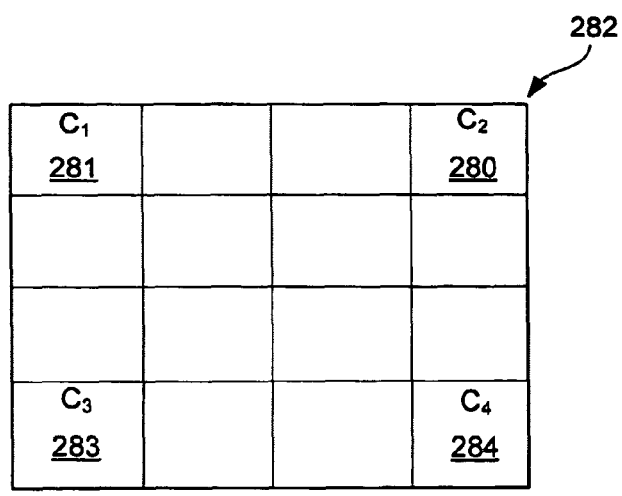
FIG. 25 is a diagram showing pixels of a 4×4 block.

FIG. 25 illustrates a 4×4 block b 280 with four corners 281, 282, 283 and 284. The process consists of checking each of the four corners of the block 281, 282, 283 and 284. Let (x, y) be the position of a corner pixel c in the high layer coordinate system. Let ($x_{base}$, $y_{base}$) be the corresponding position in the base layer coordinate system, defined as follows:

$$\begin{cases} x_{base} = \dfrac{[(x - x_{orig}) \cdot w_{base} + w_{extract}/2]}{w_{extract}} \\ y_{base} = \dfrac{[(y - y_{orig}) \cdot h_{base} + h_{extract}/2]}{h_{extract}} \end{cases} \quad (1)$$

The co-located macroblock of pixel (x, y) is then the base layer macroblock that contains pixel ($x_{base}$, $y_{base}$). In the same way, the co-located 8×8 block of pixel (x, y) is the base layer 8×8 block containing pixel ($x_{base}$, $y_{base}$) and the co-located 4×4 block of pixel (x, y) is the base layer 4×4 block containing pixel ($x_{base}$, $y_{base}$).

The motion data inheritance process for b may be described as follows:
for each corner c, the reference index r(c,listx) and motion vector mv(c,listx) of each list listx (listx=list0 or list1) are set to those of the co-located base layer 4×4 block
for each corner, if the co-located macroblock does not exist or is in intra mode, then b is set as an intra block
else, for each list listx
if none of the corners uses this list, no reference index and motion vector for this list is set to b
else
the reference index $r_b$(listx) set for b is the minimum of the existing reference indices of the 4 corners:

$$r_b(listx) = \min_c \ (r(c, listx)) \quad (2)$$

the motion vector $mv_b$(listx) set for b is the mean of existing motion vectors of the 4 corners, having the reference index $r_b$(listx).

8×8 Partitioning Choice

Figure 26:
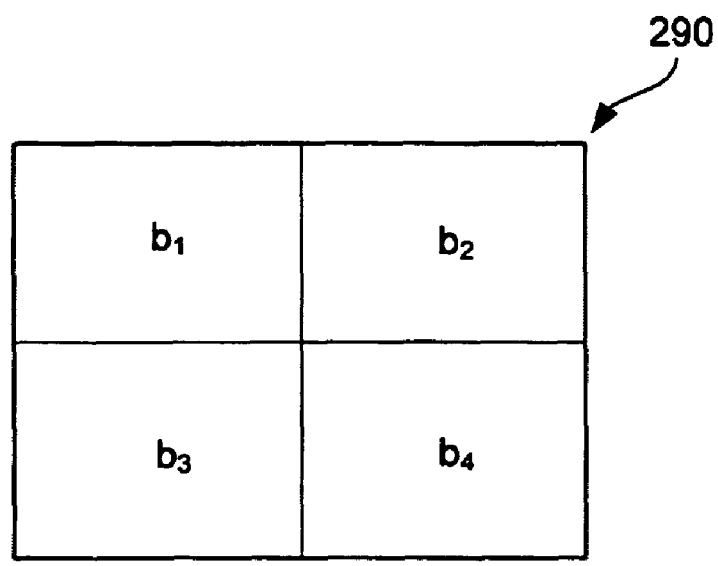
FIG. 26 is a diagram showing 4×4 blocks within an 8×8 block.

Once each 4×4 block motion data has been set, a merging process is necessary in order to determine the actual partitioning of the 8×8 block it belongs to and to avoid forbidden configurations. In the following, 4×4 blocks of an 8×8 block are identified as indicated in FIG. 26.

For each 8×8 block B, the following process may be applied:
if the 4 4×4 blocks have been classified as intra blocks, B is considered as an intra block.

else, B partitioning choice is achieved:
The following process for assigning the same reference indices to each 4×4 block is applied:
for each list listx
if no 4×4 block uses this list, no reference index and motion vector of this list are set to B
else
reference index $r_B$(listx) for B is computed as the minimum of the existing reference indices of the 4 4×4 blocks:

$$r_B(listx) = \min_b (r_b(listx)) \quad (3)$$

mean motion vector $mv_{mean}$(listx) of the 4×4 blocks having the same reference index $r_B$(listx) is computed 4×4 blocks (1) classified as intra blocks or (2) not using this list or (3) having a reference index $r_b$(listx) different from $r_B$(listx) are enforced to have $r_B$(listx) and $mv_{mean}$(listx) as reference index and motion vector.

Figure 27:
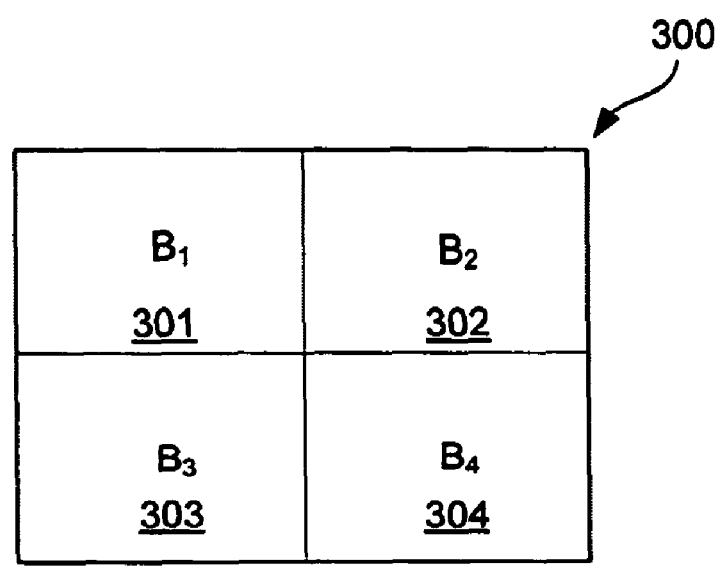
FIG. 27 is a diagram showing 8×8 blocks of a prediction macroblock.

Then the choice of the partitioning mode for B is achieved. Two 4×4 blocks are considered as identical if their motion vectors are identical. The merging process is applied as follows:
if $b_1$ is identical to $b_2$ and $b_3$ is identical to $b_4$ then
if $b_1$ is identical to $b_3$ then BLK__8×8 is chosen
else BLK__8×4 is chosen
else if $b_1$ is identical to $b_3$ and $b_2$ is identical to $b_4$ then
BLK__4×8 is chosen
else BLK__4×4 is chosen Prediction Macroblock Mode Choice In some embodiments, a process may be achieved to determine an MB_pred mode. In the following, 8×8 blocks 301-304 of the macroblock 300 are identified as indicated in FIG. 27.

Two 8×8 Blocks are Considered as Identical Blocks if:
One or both of the two 8×8 blocks are classified as intra blocks or
Partitioning mode of both blocks is BLK__8×8 and reference indices and motion vectors of list0 and list1 of each 8×8 block, if they exist, are identical.

The mode choice is done using the following process:
if all 8×8 blocks are classified as intra blocks, then MB_pred is classified as INTRA macroblock
else, MB_pred is an INTER macroblock. Its mode choice is achieved as follows:
8×8 blocks classified as intra are enforced to BLK__8×8 partitioning. Their reference indices and motion vectors are computed as follows. Let $B_{INTRA}$ be such a 8×8 block.
for each list listx
if no 8×8 block uses this list, no reference index and motion vector of this list is assigned to $B_{INTRA}$
else, the following steps are applied:
a reference index $r_{min}$(listx) is computed as the minimum of the existing reference indices of the 8×8 blocks:

$$r_{min}(listx) = \min_B (r_B(listx)) \quad (4)$$

a mean motion vector $mv_{mean}$(listx) of the 4×4 blocks having the same reference index $r_{min}$(listx) is computed
$r_{min}$(listx) is assigned to $B_{INTRA}$ and each 4×4 block of $B_{INTRA}$ is enforced to have $r_{min}$(listx) and $mv_{mean}$(listx) as reference index and motion vector.

Then the choice of the partitioning mode for B is achieved. Two 8×8 blocks are considered as identical if their Partitioning mode is BLK__8×8 and reference indices and motion vectors of list0 and list1 of each 8×8 block, if they exist, are identical. The merging process is applied as follows:
if B1 is identical to B2 and B3 is identical to B4 then
if B1 is identical to B3 then MODE__16×16 is chosen.
else MODE__16×8 is chosen.
else if B1 is identical to B3 and B2 is identical to B4 then MODE__8×16 is chosen.
else MODE__8×8 is chosen.

Motion Vectors Scaling

A motion vector rescaling may be applied to every existing motion vector of the prediction macroblock MB_pred as derived above. A Motion vector $mv=(d_x, d_y)$ may be scaled in the vector $mv_s=(d_{sx}, d_{sy})$ using the following equations:

$$\begin{cases} d_{sx} = \frac{(d_x \cdot w_{extract} + \text{sign}[d_x] \cdot w_{base}/2)}{w_{base}} + 4 \cdot (x_{orig,r} - x_{orig}) \\ d_{sy} = \frac{(d_y \cdot h_{extract} + \text{sign}[d_y] \cdot h_{base}/2)}{h_{base}} + 4 \cdot (y_{orig,r} - y_{orig}) \end{cases} \quad (5)$$

in which sign[x] is equal to 1 when x is positive, (−1) when x is negative, and 0 when x equals 0. The symbols with subscript "r" represent the geometrical parameters of the corresponding reference picture.

Inter-Layer Texture Prediction

Texture Upsampling

In some embodiments of the present invention, inter layer texture prediction may be based on the same principles as inter layer motion prediction. Base layer texture upsampling may be achieved applying the two-lobed or three-lobed Lanczos-windowed sinc functions. These filters are considered to offer the best compromise in terms of reduction of aliasing, sharpness, and minimal ringing. The two-lobed Lanczos-windowed sinc function may be defined as follows:

$$Lanczos2(x) = \begin{cases} \frac{\sin(\pi x)}{\pi x} \frac{\sin(\pi \frac{x}{2})}{\pi \frac{x}{2}}, & |x| < 2 \\ 0, & |x| \geq 2 \end{cases} \quad (6)$$

This upsampling step may be processed either on the full frame or block by block. For Intra texture prediction, repetitive padding is used at frame boundaries. For residual prediction, repetitive padding is used at block boundaries (4×4 or 8×8 depending on the transform).

In an exemplary embodiment, according to the Lanczos2 function, the following 16 4-tap upsampling filters are defined in Table 1 below for the 16 different interpolation phases in units of one-sixteenth sample spacing relative to the sample grid of corresponding component in the base layer picture.

For a luma sample in the current layer at position (x, y), the phase shift relative to the corresponding samples in the base layer picture shall be derived as:

$$\begin{cases} p_{x,L} = \dfrac{[(x - x_{orig}) \cdot w_{base} \cdot 16]}{w_{extract}} - 16 \cdot \left[\dfrac{(x - x_{orig}) \cdot w_{base}}{w_{extract}}\right] \\ p_{y,L} = \dfrac{[(y - y_{orig}) \cdot h_{base} \cdot 16]}{h_{extract}} - 16 \cdot \left[\dfrac{(y - y_{orig}) \cdot h_{base}}{h_{extract}}\right] \end{cases} \quad (7)$$

TABLE 1

4-tap interpolation filters for upsampling

| | (4-tap) interpolation filter coefficients | | | |
|---|---|---|---|---|
| phase | e[−1] | e[0] | e[1] | e[2] |
| 0  | 0   | 128 | 0   | 0   |
| 1  | −4  | 127 | 5   | 0   |
| 2  | −8  | 124 | 13  | −1  |
| 3  | −10 | 118 | 21  | −1  |
| 4  | −11 | 111 | 30  | −2  |
| 5  | −11 | 103 | 40  | −4  |
| 6  | −10 | 93  | 50  | −5  |
| 7  | −9  | 82  | 61  | −6  |
| 8  | −8  | 72  | 72  | −8  |
| 9  | −6  | 61  | 82  | −9  |
| 10 | −5  | 50  | 93  | −10 |
| 11 | −4  | 40  | 103 | −11 |
| 12 | −2  | 30  | 111 | −11 |
| 13 | −1  | 21  | 118 | −10 |
| 14 | −1  | 13  | 124 | −8  |
| 15 | 0   | 5   | 127 | −4  |

For a chroma sample in the current layer at position $(x_c, y_c)$ in the chroma sample coordinate system, the phase shift relative to the corresponding samples in the base layer picture may be derived as:

$$\begin{cases} p_{x,c} = \dfrac{[(x_c - x_{orig,c}) \cdot w_{base,c} \cdot 16]}{w_{extract,c}} - 16 \cdot \left[\dfrac{(x_c - x_{orig,c}) \cdot w_{base,c}}{w_{extract,c}}\right] \\ p_{y,c} = \dfrac{[(y_c - y_{orig,c}) \cdot h_{base,c} \cdot 16]}{h_{extract,c}} - 16 \cdot \left[\dfrac{(y_c - y_{orig,c}) \cdot h_{base,c}}{h_{extract,c}}\right] \end{cases} \quad (8)$$

in which $$w_{base,c} = w_{base} \cdot \text{BasePicMbWidth}C/16 \quad (9)$$

$$w_{extract,c} = w_{extract} \cdot \text{MbWidth}C/16 \quad (10)$$

$$h_{base,c} = h_{base} \cdot \text{BasePicMbHeight}C/16 \quad (11)$$

$$h_{extract,c} = h_{extract} \cdot \text{MbHeight}C/16 \quad (12)$$

$$x_{orig,c} = x_{orig} \cdot \text{MbWidth}C/16 \quad (13)$$

$$y_{orig,c} = y_{orig} \cdot \text{MbHeight}C/16 \quad (14)$$

According to each phase shift derived, a 4-tap filter can be chosen from Table 1 for interpolation.

Inter-Layer Intra Texture Prediction

In WD-1.0 [MPEG Doc. N6901], the I_BL mode requires all the corresponding base-layer macroblocks to be intra-coded. In embodiments of the present invention the requirement may be relaxed to allow that the corresponding base-layer macroblocks be inter-coded or not-existing.

For generating the intra prediction signal for macroblocks coded in I_BL mode, the co-located blocks (if any) of the base layer signals are directly de-blocked and interpolated. For 4 input samples (X[n−1], X[n], X[n+1], X[n+2]), the output value Y of a 4-tap interpolation filter shall be derived as:

$$Y = \text{Clip1}_Y((e[-1]X[n-1] + e[0]X[n] + e[1]X[n+1] + e[2]X[n+2] + 64)/128) \quad (15)$$

with $\text{Clip1}_Y(x) = \min(\max(0, x), (1 \ll \text{BitDepth}_Y) - 1)$ in which $\text{BitDepth}_Y$ represents the bit depth of the luma channel data, for luma sample, or $$Y = \text{Clip1}_C((e[-1]X[n-1] + e[0]X[n] + e[1]X[n+1] + e[2]X[n+2] + 64)/128) \quad (16)$$

with $\text{Clip1}_C(x) = \min(\max(0, x), (1 \ll \text{BitDepth}_C) - 1)$ in which $\text{BitDepth}_C$ represents the bit depth of the chroma channel data, for Chroma sample.

Because rounding operations are applied in Equations 15 and 16, the filtering order may be specified as horizontally first or vertically first. It is recommended that filter operations are performed in the horizontal direction first and then followed by filter operations in the vertical direction. This upsampling process is invoked only when extended_spatial_scalability, defined below, is enabled.

After the upsampling filter operation, constant values shall be used to fill the image regions outside of the cropping window. The constant shall be $(1 \ll (\text{BitDepth}_Y - 1))$ for luma or $(1 \ll (\text{BitDepth}_C - 1))$ for chroma.

Inter-Layer Residual Prediction

Similar to Inter-Layer Intra Texture Prediction, the same 4-tap filters, or other filters, may be applied when upsampling the base layer residuals, but with different rounding and clipping functions from that in Equations 15 and 16.

For 4 input residual samples (X[n−1], X[n], X[n+1], X[n+2]), the output value Y of the filter shall be derived as:

$$Y = \text{Clip1}_{Y,r}((e[-1]X[n-1] + e[0]X[n] + e[1]X[n+1] + e[2]X[n+2])/128) \quad (17)$$

for luma residual sample, or $$Y = \text{Clip1}_{C,r}((e[-1]X[n-1] + e[0]X[n] + e[1]X[n+1] + e[2]X[n+2])/128) \quad (18)$$

for Chroma residual sample.

The clipping functions for residual upsampling are defined as:

$$\text{Clip1}_{Y,r}(x) = \text{Clip3}(1 - (1 \ll \text{BitDepth}_Y), (1 \ll \text{BitDepth}_Y) - 1, x) \quad (19)$$

$$\text{Clip1}_{C,r}(x) = \text{Clip3}(1 - (1 \ll \text{BitDepth}_C), (1 \ll \text{BitDepth}_C) - 1, x) \quad (20)$$

where $\text{Clip3}(a, b, x) = \min(\max(a, x), b)$.

Similarly, after the upsampling filter operation, constant values shall be used to fill the pixel positions where residual prediction is not available, including image regions outside of the cropping window. The constant shall be 0 for all color components.

Changes in Syntax and Semantics

Syntax in Tabular Form

Embodiments of the present invention may utilize the following changes are indicated below in large bold text. The main changes are the addition in the sequence parameter set of a symbol, extended_spatial_scalability, and accordingly four parameters:

scaled_base_left_offset_divided_by_two,
scaled_base_top_offset_divided_by_two,
scaled_base_right_offset_divided_by_two,
scaled_base_bottom_offset_divided_by_two in sequence parameter set and slice_data_in_scalable_extension( ) related to the geometrical transformation to be applied in the base layer upsampling process.

Sequence Parameter Set Syntax in Scalable Extension

| seq_parameter_set_rbsp( ) { | C | Descriptor |
|---|---|---|
| ...... | ... | ... |
|     extended_spatial_scalability | 0 | u(2) |
|     if( extended_spatial_scalability == 1 ) { | | |
|         scaled_base_left_offset_divided_by_two | 0 | ue(v) |
|         scaled_base_top_offset_divided_by_two | 0 | ue(v) |
|         scaled_base_right_offset_divided_by_two | 0 | ue(v) |
|         scaled_base_bottom_offset_divided_by_two | 0 | ue(v) |
|     } | | |
| ...... | ... | ... |
|     rbsp_trailing_bits( ) | 0 | |
| } | | |

Slice Data Syntax in Scalable Extension

| slice_data_in_scalable_extension( ) { | C | Descriptor |
|---|---|---|
|     if( extended_spatial_scalability == 2 ) { | | |
|         scaled_base_left_offset_divided_by_two | 2 | ue(v) |
|         scaled_base_top_offset_divided_by_two | 2 | ue(v) |
|         scaled_base_right_offset_divided_by_two | 2 | ue(v) |
|         scaled_base_bottom_offset_divided_by_two | 2 | ue(v) |
|     } | | |
|     if( extended_spatial_scalability ) | | |
|         HalfSpatResBaseFlag = 0 | | |
|     else | | |
|         HalfSpatResBaseFlag = half_spat_res_base_pic( ) | | |
| ...... | ... | ... |
| } | | |

Macroblock Layer Syntax in Scalable Extension

| macroblock_layer_in_scalable_extension( ) { | C | Descriptor |
|---|---|---|
|     if( base_id_plus1 != 0 && adaptive_prediction_flag ) { | | |
|         base_mode_flag | 2 | ae(v) |
|         if( ! base_mode_flag && | | |
|           (HalfSpatResBaseFlag || extended_spatial_scalability) && | | |
|           ! intra_base_mb( CurrMbAddr ) ) | | |
|           base_mode_refinement_flag | 2 | ae(v) |
|     } | | |
| ...... | ... | ... |
| } | | |

Semantics

Sequence Parameter Set Syntax in Scalable Extension extended_spatial_scalability specifies the presence of syntax elements related to geometrical parameters for the base layer upsampling. When extended_spatial_scalability is equal to 0, no geometrical parameter is present in the bitstream. When extended_spatial_scalability is equal to 1, geometrical parameters are present in the sequence parameter set. When extended_spatial_scalability is equal to 2, geometrical parameters are present in slice_data_in_scalable_extension. The value of 3 is reserved for extended_spatial_scalability. When extended_spatial_scalability is not present, it shall be inferred to be equal to 0.

scaled_base_left_offset_divided_by_two specifies half of the horizontal offset between the upper-left pixel of the upsampled base layer picture and the upper-left pixel of the current picture. When scaled_base_left_offset_divided_by_two is not present, it shall be inferred to be equal to 0.

scaled_base_top_offset_divided_by_two specifies half of the vertical offset of the upper-left pixel of the upsampled base layer picture and the upper-left pixel of the current picture. When scaled_base_top_offset_divided_by_two is not present, it shall be inferred to be equal to 0.

scaled_base_right_offset_divided_by_two specifies half of the horizontal offset between the bottom-right pixel of the upsampled based layer picture and the bottom-right pixel of the current picture. When scaled_base_right_offset_divided_by_two is not present, it shall be inferred to be equal to 0.

scaled_base_bottom_offset_divided_by_two specifies half of the vertical offset between the bottom-right pixel of the upsampled based layer picture and the bottom-right pixel of the current picture. When scaled_base_bottom_offset_divided_by_two is not present, it shall be inferred to be equal to 0.

All geometrical parameters are specified as unsigned integer in units of one-sample spacing relative to the luma sampling grid in the current layer. Several additional symbols (scaled_base_left_offset, scaled_base_top_offset, scaled_base_right_offset, scaled_base_bottom_offset, scaled_base_width, scaled_base_height) are then defined based on the geometrical parameters:

scaled_base_left_offset=2·scaled_base_left_offset_divided_by_two scaled_base_top_offset=2·scaled_base_top_offset_divided_by_two
scaled_base_right_offset=2·scaled_base_right_offset_divided_by_two
scaled_base_bottom_offset=2·scaled_base_bottom_offset_divided_by_two
scaled_base_width=PicWidthInMbs·16−scaled_base_left_offset_scaled_base_right_offset
scaled_base_height=PicHeightInMapUnits·16−scaled_base_top_offset_scaled_base_bottom_offset Slice Data Syntax in Scalable Extension Semantics of the syntax elements in the slice data are identical to that of the same syntax elements in the sequence parameter set.

Decoding Process

Decoding Process for Prediction Data

Compared to WD-1.0 [MPEG Doc. N6901], the following processes must be added. For each macroblock, the following applies:

If extended_spatial_scalability is equal to 1 or 2 and base_layer_mode_flag is equal to 1, the motion vector field including the macroblock partitioning is derived using the process described in Section 3. As in WD-1.0 [MPEG Doc. N6901], if all corresponding base-layer macroblocks are intra-coded, the current macroblock mode is set to I_BL.

else, if extended_spatial_scalability is equal to 1 or 2 and base_layer_mode_flag is equal to 0 but base_layer_refinement is equal to 1, the base layer refinement mode is signaled. The base layer refinement mode is similar to the base layer prediction mode. The macroblock partitioning as well as the reference indices and motion vectors are derived following Section 3. However, for each motion vector a quarter-sample motion vector refinement mvd_ref_1X (−1, 0, or +1 for each motion vector component) is additionally transmitted and added to the derived motion vectors. The rest of the process is identical as in WD-1.0 [MPEG Doc. N6901].

Decoding Process for Subband Pictures

Compared to WD-1.0 [MPEG Doc. N6901], the following processes must be added:

If extended_spatial_scalability is equal to 1 or 2, intra prediction signal for an MB in I_BL mode is generated by the following process.

The collocated base layer blocks/macroblocks are filtered.

The intra prediction signal is generated by interpolating the deblocked. The interpolation is performed using process described in Section 4.

The rest of the process is identical as in WD-1.0 [MPEG Doc. N6901].

Otherwise, if extended_spatial_scalability is equal to 1 or 2, and residual_prediction—flag is equal to 1, the following applies.

The residual signal of the base layer blocks is upsampled and added to the residual signal of the current macroblock. The interpolation is performed using process described in Section 4.

Changes to Loop Filter

When extended_spatial_scalability is equal to 1 or 2, a minor change should apply to the loop filter during filter strength decision for a block in I_BL mode.

If the neighboring block is intra-coded but not in I_BL mode, the Bs is 4 (this first part is as same as in WD-1.0 [MPEG Doc. N6901]).

Otherwise, if any of the adjacent blocks has coefficient, the Bs is 2.

Otherwise, if the neighboring block is not in I_BL mode, the Bs is 1.

Otherwise, Bs is 0.

6-Tap Filter Embodiments

Some embodiments of the present invention are designed for use with the Scalable Video Coding extension of H.264/MPEG-4 AVC, especially for the Extended Spatial Scalable (ESS) video coding feature adopted in April 2005 by JVT (Joint Video Team of MPEG and VCEG).

In the current SVC design, the upsampling process is based on the quarter luma sample interpolation procedure that is specified in H.264 for inter prediction. The method inherits two drawbacks when applied to spatial scalable coding: (1) the interpolation resolution is limited to quarter samples, and (2) the half sample interpolation must be performed in order to get to a quarter sample position.

Some embodiments of the present invention remove these drawbacks by (1) finer interpolation resolution, and (2) direct interpolation. Consequently, these embodiments reduce the computational complexity while improving the quality of the up-sampled pictures.

The upsampling technique of exemplary embodiments of the present invention is based on direct interpolation with 16 6-tap filters. The filter selection is according to the interpolation positions or phases, ranging from 0 to 15 in units of one-sixteenth picture samples. The set of filters are designed to be backward compatible with the half sample interpolation process of SVC and the half sample luma inter prediction of H.264. Therefore, the technique of these embodiments can be a natural extension of H.264 from hardware/software implementation point of view.

Conventional spatial scalable video coding systems typically deal with cases in which spatial or resolution scaling-factor is 2 or a power of 2. In April 2005, Extended Spatial Scalability was adopted into SVC Joint Scalable Video Model (JSVM) to handle more generic applications in which spatial scaling factor is not limited to the power of 2. The upsampling procedure for inter-layer texture prediction, however, is still a developing issue. During the JVT meeting in April 2005, a decision was made to temporarily adopt the quarter luma sample interpolation process specified in H.264 for texture upsampling.

In these embodiments of the present invention, the same geometric relationships that were described for the above-described embodiments in relation to FIG. 23 apply as well.

In above-described embodiments, a set of 16 4-tap upsampling filters were defined for the 16 different interpolation phases in units of one-sixteenth sample spacing relative to the integer sample grid of corresponding component in the base layer picture. The 4-tap filters, however, are not backward compatible to the earlier H.264 design. Consequently, these embodiments may comprise a new set of 16 6-tap filters and corresponding filtering procedures. In an exemplary embodiment, the 6-tap filters described in Table 2 may be used. In another exemplary embodiment, the 6-tap filters described in Table 3 may be used.

TABLE 2

First exemplary 16-phase interpolation filter (6-tap) interpolation filter coefficients

| phase | e[−2] | e[−1] | e[0] | e[1] | e[2] | e[3] |
|---|---|---|---|---|---|---|
| 0 | 0 | 0 | 32 | 0 | 0 | 0 |
| 1 | 0 | −2 | 32 | 2 | 0 | 0 |
| 2 | 1 | −3 | 31 | 4 | −1 | 0 |

TABLE 2-continued

First exemplary 16-phase interpolation filter (6-tap) interpolation filter coefficients

| phase | e[−2] | e[−1] | e[0] | e[1] | e[2] | e[3] |
|---|---|---|---|---|---|---|
| 3  | 1 | −4 | 30 | 7  | −2 | 0 |
| 4  | 1 | −4 | 28 | 9  | −2 | 0 |
| 5  | 1 | −5 | 27 | 11 | −3 | 1 |
| 6  | 1 | −5 | 25 | 14 | −3 | 0 |
| 7  | 1 | −5 | 22 | 17 | −4 | 1 |
| 8  | 1 | −5 | 20 | 20 | −5 | 1 |
| 9  | 1 | −4 | 17 | 22 | −5 | 1 |
| 10 | 0 | −3 | 14 | 25 | −5 | 1 |
| 11 | 1 | −3 | 11 | 27 | −5 | 1 |
| 12 | 0 | −2 | 9  | 28 | −4 | 1 |
| 13 | 0 | −2 | 7  | 30 | −4 | 1 |
| 14 | 0 | −1 | 4  | 31 | −3 | 1 |
| 15 | 0 | 0  | 2  | 32 | −2 | 0 |

TABLE 3

Second exemplary 16-phase interpolation filter (6-tap) interpolation filter coefficients

| phase | e[−2] | e[−1] | e[0] | e[1] | e[2] | e[3] |
|---|---|---|---|---|---|---|
| 0  | 0 | 0  | 32 | 0  | 0  | 0 |
| 1  | 0 | −2 | 32 | 2  | 0  | 0 |
| 2  | 1 | −3 | 31 | 4  | −1 | 0 |
| 3  | 1 | −4 | 30 | 6  | −1 | 0 |
| 4  | 1 | −4 | 28 | 9  | −2 | 0 |
| 5  | 1 | −4 | 27 | 11 | −3 | 0 |
| 6  | 1 | −5 | 25 | 14 | −3 | 0 |
| 7  | 1 | −5 | 22 | 17 | −4 | 1 |
| 8  | 1 | −5 | 20 | 20 | −5 | 1 |
| 9  | 1 | −4 | 17 | 22 | −5 | 1 |
| 10 | 0 | −3 | 14 | 25 | −5 | 1 |
| 11 | 0 | −3 | 11 | 27 | −4 | 1 |
| 12 | 0 | −2 | 9  | 28 | −4 | 1 |
| 13 | 0 | −1 | 6  | 30 | −4 | 1 |
| 14 | 0 | −1 | 4  | 31 | −3 | 1 |
| 15 | 0 | 0  | 2  | 32 | −2 | 0 |

Given a luma sample position (x, y) in the enhancement picture in units of integer luma samples, its corresponding position in the base picture ($p_{x,L}$, $p_{y,L}$) in units of one-sixteenth luma samples of the base picture can be derived as $$\begin{cases} p_{x,L}(x) = \left[(x - x_{orig}) \cdot w_{base} \cdot R_L + \frac{R_L}{2}(w_{base} - w_{extract})\right] // w_{extract} \\ p_{y,L}(y) = \left[(y - y_{orig}) \cdot h_{base} \cdot R_L + \frac{R_L}{2}(h_{base} - h_{extract})\right] // h_{extract} \end{cases} \quad (21)$$

in which $R_L=16$ (for one-sixteenth-sample resolution interpolation), as in FIG. 23 ($x_{orig}$, $y_{orig}$) represents the position of the upper-left corner of the cropping window in the current picture in units of single luma samples of current picture, ($w_{base}$, $h_{base}$) is the resolution of the base picture in units of single luma samples of the base picture, ($w_{extract}$, $h_{extract}$) is the resolution of the cropping window in units of the single luma samples of current picture, and "//" represents a simplified division operator.

Similarly, given a chroma sample position ($x_c$, $y_c$) in the enhancement picture in units of single chroma samples, its corresponding position in the base picture ($p_{x,c}$, $p_{y,c}$) in units of one-sixteenth chroma samples of the base picture can be derived as $$\begin{cases} p_{x,c}(x_c) = \left[\begin{array}{c}(x_c - x_{orig,c}) \cdot w_{base,c} \cdot R_C + \frac{R_C}{4}(2 + p_{enh,x}) \\ w_{base,c} - \frac{R_C}{4}(2 + p_{base,x}) w_{extract,c}\end{array}\right] // w_{extract,c} \\ p_{y,c}(y_c) = \left[\begin{array}{c}(y_c - y_{orig,c}) \cdot h_{base,c} \cdot R_C + \frac{R_C}{4}(2 + p_{enh,y}) \\ h_{base,c} - \frac{R_C}{4}(2 + p_{base,y}) h_{extract,c}\end{array}\right] // h_{extract,c} \end{cases} \quad (22)$$

in which $R_C=16$, ($x_{orig,c}$, $y_{orig,c}$) represents the position of the upper-left corner of the cropping window in the current picture in units of single chroma samples of current picture, ($w_{base,c}$, $h_{base,c}$) is the resolution of the base picture in units of single chroma samples of the base picture, ($w_{extract,c}$, $h_{extract,c}$) is the resolution of the cropping window in units of the single chroma samples of current picture, ($p_{base,x}$, $p_{base,y}$) represents the relative chroma phase shift of the base picture in units of quarter chroma samples of the base picture, and ($p_{enh,x}$, $p_{enh,y}$) represents the relative chroma phase shift of the current picture in units of quarter chroma samples of the current picture.

A 6-tap filter can be selected from Table 2 or Table 3 based on the interpolation positions derived by Eqs. 21 and 22. In some embodiments, when the interpolation position is a half sample position, the filter is as same as that in H.264 defined for half luma sample interpolation. Therefore, the similar hardware/software modules can be applied for the technique of these embodiments of the present invention.

For inter-layer residual upsampling, similar direct interpolation methods can be used, however, with the bilinear interpolation filters instead of the 6-tap filters for texture upsampling or the 4-tap filters described above.

In some exemplary embodiments, an interpolation process is as follows.

1. Define position (xP, yP) for the upper-left luma sample of a macroblock in the enhancement picture. When chroma_format_idc is not equal to 0, i.e., the chroma channels exist, define position (xC, yC) for the upper-left chroma samples of the same macroblock.

2. Derive the relative location of the macroblock in the base-layer picture, $$\begin{cases} xB = p_{x,L}(xP) >> 4 \\ yB = p_{y,L}(yP) >> 4 \end{cases} \quad (23)$$

$$\begin{cases} xB1 = (p_{x,L}(xP+15)+15) >> 4 \\ yB1 = (p_{y,L}(yP+15)+15) >> 4 \end{cases} \quad (24)$$

and when chroma_format_idc is not equal to 0, $$\begin{cases} xCB = p_{x,C}(xC) >> 4 \\ yCB = p_{y,C}(yC) >> 4 \end{cases} \quad (25)$$

$$\begin{cases} xCB1 = (p_{x,C}(xC + MbWidthC - 1) + 15) >> 4 \\ yCB1 = (p_{y,C}(yC + MbHeightC - 1) + 15) >> 4 \end{cases} \quad (26)$$

in which MbWidthC and MbHeightC represent the number of chroma samples per MB in horizontal and vertical directions, respectively.

3. Texture Interpolation process
Inputs to this process include
  integer luma sample positions in base picture (xB, yB) and (xB1, yB1)
  a luma sample array for the base picture $base_L[x, y]$ with x=−2+xB ... (xB1+2) and y=−2+yB ... (yB1+2)
  when chroma_format_idc is not equal to 0,
    integer chroma sample positions in base picture (xCB, yCB) and (xCB1, yCB1)
    two chroma sample arrays for the base picture $base_{Cb}[x, y]$ and $base_{Cr}[x, y]$ with x=−2+xCB ... (xCB1+2) and y=−2+yCB ... (yCB1+2)
Outputs of this process include
  a luma sample macroblock array $pred_L[x, y]$ with x=0 ... 15 and y=0 ... 15
  when chroma_format_idc is not equal to 0, two chroma sample macroblock arrays $pred_{Cb}[x, y]$ and $pred_{Cr}[x, y]$ with x=0 ... MbWidthC−1 and y=0 ... MbHeightC−1
The luma samples $pred_L[x, y]$ with x=0 ... 15 and y=0 ... 15 are derived as follows.
  Let $temp_L[x, y]$ with x=−2+xB ... (xB1+2) and y=0 ... 15 be a temporary luma sample array.
  Each $temp_L[x, y]$ with x=−2+xB ... (xB1+2) and y=0 ... 15 is derived as follows
    The corresponding fractional-sample position yf in base layer is derived as follows.

$yf=p_{y,L}(y+yP)$

Let yInt and yFrac be defined as follows $yInt=(yf>>4)$ $yFrac=yf\%16$

Select a six-tap filter e[j] with j=−2 ... 3 from Table 2 using yFrac as phase, and derive $temp_L[x, y]$ as $temp_L[x, y]=base_L[x, yInt-2]*e[-2]+base_L[x, yInt-1]*e[-1]+base_L[x, yInt]*e[0]+base_L[x, yInt+1]*e[1]+base_L[x, yInt+2]*e[2]+base_L[x, yInt+3]*e[3]$ Each sample $pred_L[x, y]$ with x=0 ... 15 and y=0 ... 15 is derived as follows.
    The corresponding fractional-sample position xf in base layer is derived as follows.

$xf=P_{x,L}(x+xP)$

Let xInt and xFrac be defined as follows $xInt=(xf>>4)$ $xFrac=xf\%16$

Select a six-tap filter e[j] with j=−2 ... 3 from Table 2 using xFrac as phase, and derive $pred_L[x, y]$ as $pred_L[x, y]=Clip1_Y((temp_L[xInt-2, y]*e[-2]+temp_L[xInt-1, y]*e[-1]+temp_L[xInt+1, y]*e[1]+temp_L[xInt+2, y]*e[2]+temp_L[xInt+3, y]*e[3]+512)/1024)$ When chroma_format_idc is not equal to 0, the chroma samples $pred_C[x, y]$ ( with C being Cb or Cr) with x=0 ... MbWidthC−1, y=0 ... MbHeightC−1 are derived as follows.
  Let $tmp1_{Cb}[x, y]$ and $tmp1_{Cr}[x, y]$ with x=−2+xCB ... (xCB1+2) and y=0 ... MbHeightC−1 be temporary chroma sample arrays.
  Each $temp_C[x, y]$ with C as Cb and Cr, x=−2+xCB ... (xCB1+2), and y=0 ... MbHeightC−1 is derived as follows
    The corresponding fractional-sample position yfC in base layer is derived as follows.

$yfC=p_{y,C}(y+yC)$

Let yIntC and yFracC be defined as follows $yIntC=(yfC>>4)$ $yFracC=yfC\%16$

Select a six-tap filter e[j] with j=−2 ... 3 from Table 2 using yFracC as phase, and derive $temp_C[x, y]$ as $temp_C[x, y]=base_C[x, yIntC-2]*e[-2]+base_C[x, yIntC-1]*e[-1]+base_C[x, yIntC]*e[0]+base_C[x, yIntC+1]*e[1]+base_C[x, yIntC+2]*e[2]+base_C[x, yIntC+3]*e[3]$ Each sample $pred_C[x, y]$ with C as Cb and Cr, x=0 ... MbWidthC−1 and y=0 ... MbHeightC−1 is derived as follows.
  The corresponding fractional-sample position xfC in base layer is derived as follows.

$xfC=p_{x,C}(x+xC)$

Let xIntC and xFracC be defined as follows $xIntC=(xfC>>4)$ $xFracC=xfC\%16$

Select a six-tap filter e[j] with j=−2 ... 3 from Table 2 using xFracC as phase, and derive $pred_C[x, y]$ as $pred_C[x, y]=Clip1_C((temp_C[xIntC-2, y]*e[-2]+temp_C[xIntC-1, y]*e[-1]+temp_C[xIntC, y]*e[0]+temp_C[xIntC+1, y]*e[1]+temp_C[xIntC+2, y]*e[2]+temp_C[xIntC+3, y]*e[3]+512)/1024)$ 4. Texture Interpolation process
Inputs to this process include
  integer luma sample positions in basePic (xB, yB) and (xB1, yB1)
  a luma residual sample array $resBase_L[x, y]$ with x=−xB ... xB1 and y=yB ... yB1
  when chroma_format_idc is not equal to 0,
    integer chroma sample positions in basePic (xCB, yCB) and (xCB1, yCB1)
    two chroma residual sample arrays $resBase_{Cb}[x, y]$ and $resBase_{Cr}[x, y]$ with x=xCB ... xCB1 and y=yCB ... yCB1
Outputs of this process include
  a luma sample array $resPred_L[x, y]$ with x=0 ... 15 and y=0 ... 15
  when chroma_format_idc is not equal to 0, two chroma sample arrays $resPred_{Cb}[x, y]$ and $resPred_{Cr}[x, y]$ with x=0 ... MbWidthC−1 and y=0 ... MbHeightC−1
The luma residual samples $resPred_L[x, y]$ with x=0 ... 15 and y=0 ... 15 are derived as follows.
  Let $temp_L[x, y]$ with x=xB ... xB1 and y=0 ... 15 be a temporary luma sample array.
  Each $temp_L[x, y]$ with x=−xB ... xB and y=0 ... 15 is derived as follows
    The corresponding fractional-sample position yf in base layer is derived as follows.

$yf=p_{y,L}(y+yP)$

Let yInt and yFrac be defined as follows $yInt=(yf>>4)$ $yFrac=yf\%16$

Derive $temp_L[x, y]$ as $temp_L[x, y]=resBase_L[x, yInt]*(16-yFrac)+resBase_L[x, yInt+1]*yFrac$ Each residual sample $resPred_L[x, y]$ with x=0 . . . 15 and y=0 . . . 15 is derived as follows.
The corresponding fractional-sample position xf in base layer is derived as follows.

$xf = P_{x,L}(X + xP)$

Let xInt and xFrac be defined as follows $xInt = (xf >> 4)$ $xFrac = xf \% 16$

Derive $resPred_L[x, y]$ as $resPred_L[x, y] = Clip1_{Y,r}((temp_L[xInt, y]*(16-xFrac)+ temp_L[xInt+1, y]*xFrac)/256)$ with
$Clip1_{Y,r}(x) = Clip3(1-(1<<BitDepth_Y), (1<<BitDepth_Y)-1, x)$
in which $BitDepth_Y$ represents the bit depth of the luma channel data.

When chroma_format_idc is not equal to 0, the chroma residual samples $resPred_C[x, y]$ (with C being Cb or Cr) with x=0 . . . MbWidthC−1, y=0 . . . MbHeightC−1 are derived as follows.

Let $tmp1_{Cb}[x, y]$ and $tmp1_{Cr}[x, y]$ with x=xCB . . . xCB1 and y=0 . . . MbHeightC−1 be temporary chroma sample arrays.

Each $temp_C[x, y]$ with C as Cb and Cr, x=−xCB . . . xCB1, and y=0 . . . MbHeightC−1 is derived as follows
The corresponding fractional-sample position yfC in base layer is derived as follows.

$yfC = p_{y,C}(y + yC)$

Let yIntC and yFracC be defined as follows $yIntC = (yfC >> 4)$ $yFracC = yfC \% 16$ Derive $temp_C[x, y]$ as $temp_C[x, y] = resBase_C[x, yIntC]*(16-yFracC)+resBase_C[x, yIntC+1]*yFracC$ Each sample $resPred_C[x, y]$ with C as Cb and Cr, x=0 . . . MbWidthC−1 and y=_0 . . . MbHeight−1 is derived as follows.
The corresponding fractional-sample position xfC in base layer is derived as follows.

$xfC = p_{x,C}(x + xC)$

Let xIntC and xFracC be defined as follows $xIntC = (xfC >> 4)$ $xFracC = xfC \% 16$ Derive $resPred_C[x, y]$ as $resPred_C[x, y] = Clip1_{C,r}(temp_C[xIntC, y]*(16-xFracC)+temp_C[xIntC+1, y]*xFracC)/256)$ with
$Clip1_{C,r}(x) = Clip3(1-(1<<BitDepth_C), (1<<BitDepth_C)-1, x)$
in which $BitDepth_C$ represents the bit depth of the chroma channel data.

Some embodiments of the present invention comprise a deblocking filter for spatial scalable video coding. In some of these embodiments the filtering method is designed for the Scalable Video Coding (SVC) extension of H.264/MPEG-4 AVC, especially for the Extended Spatial Scalable (ESS) video coding feature adopted in April 2005 by JVT (Joint Video Team of MPEG and VCEG).

In prior methods, the filtering process was identical across all layers with possibly various spatial resolutions. A block coded using inter-layer texture prediction was considered as an intra-coded block during the filtering process. This prior method has two drawbacks when being applied to spatial scalable coding: (1) the prediction from a lower resolution layer can be unnecessarily blurred and therefore (2) the process unnecessarily spends more computational cycles.

Embodiments of the present invention may remove both of these drawbacks by skipping filter operations for some block boundaries, by applying different filters to different block boundaries, by varying the aggressiveness of a filter on different block boundaries or by otherwise adjusting filter characteristics for specific block boundaries. As a result, these embodiments reduce the computational complexity and improve the quality of the up-sampled pictures.

In these embodiments, we consider the blocks coded using inter-layer texture prediction as Inter blocks so the filtering decisions in the existing AVC design for the inter blocks are applied. In some embodiments, the adaptive block boundary filtering described above in relation to adjacent blocks with non-spatially-scalable coding may be applied to spatial scalable coding. These methods, adopted into H.264, may be applied to spatial scalable video coding.

In some embodiments of the present invention, a deblocking filter for an image block boundary can be characterized by a control parameter Boundary Strength (Bs), which may have a value in the range of 0 to 4 or some other range. The higher the Bs value, the stronger the filter operation applied to the corresponding boundary. When Bs is equal to 0, the filter operation may be skipped or minimized.

In the current SVC design, a macroblock prediction mode based on inter-layer texture prediction is called I_BL mode. Using prior methods, all block boundaries related to an I_BL macroblock had to be filtered, i.e., with Bs>0 for all block boundaries.

Embodiments of the present invention comprise a filter strength decision method for a block in I_BL mode for the spatial scalable coding, i.e., when the symbol in SVC SpatialScalabilityType is not equal to 0. The purpose is to reduce the computational complexity and avoid blurring the prediction from the base layer.

In some embodiments, for a block in I_BL mode, the Bs of a boundary between the block and a neighboring block may be derived as follows:
1. If the neighboring block is intra-coded but not in I_BL mode, the Bs is 4.
2. Otherwise, if any of the adjacent blocks has a non-zero coefficient, the Bs is 2.
3. Otherwise, if the neighboring block is not in I_BL mode based on the same base layer picture, the Bs is 1.
4. Otherwise, Bs is 0.

In embodiments of the present invention related to the SVC extension of the JVT, if SpatialScalabilityType is not equal to 0 and either luma sample $p_0$ or $q_0$ is in macroblocks coded using the I_BL macroblock prediction mode, the variable bS is derived as follows:
If either luma samples $p_0$ or $q_0$ is in a macroblock coded using an intra prediction mode other than the I_BL mode, a value of bS equal to 4 shall be the output;
Otherwise, if one of the following conditions is true, a value of bS equal to 2 shall be the output,
  i. the luma block containing sample $p_0$ or the luma block containing sample $q_0$ contains non-zero transform coefficient levels, p2 ii. the syntax element nal_unit_type is equal to 20 and residual_prediction_flag is equal to 1 for the luma block containing sample $p_0$ or the luma block containing sample $q_0$ and the prediction array resPredX as derived in subclause S.8.5.14 contains non-zero samples, with X indicating the applicable component L, Cb, or Cr;

Otherwise, if one of the following conditions is true, a value of bS equal to 1 shall be the output,
  i. either luma samples $p_0$ or $q_0$ is in a macroblock coded using an inter prediction mode,
  ii. the luma samples $p_0$ and $q_0$ are in two separate slices with different base_id_plus1;

Otherwise, a value of Bs equal to 0 shall be the output;

Otherwise, if the samples $p_0$ and $q_0$ are both in macroblocks coded using the I_BL macroblock prediction mode, a value of Bs equal to 1 shall be the output.

Figure 28:
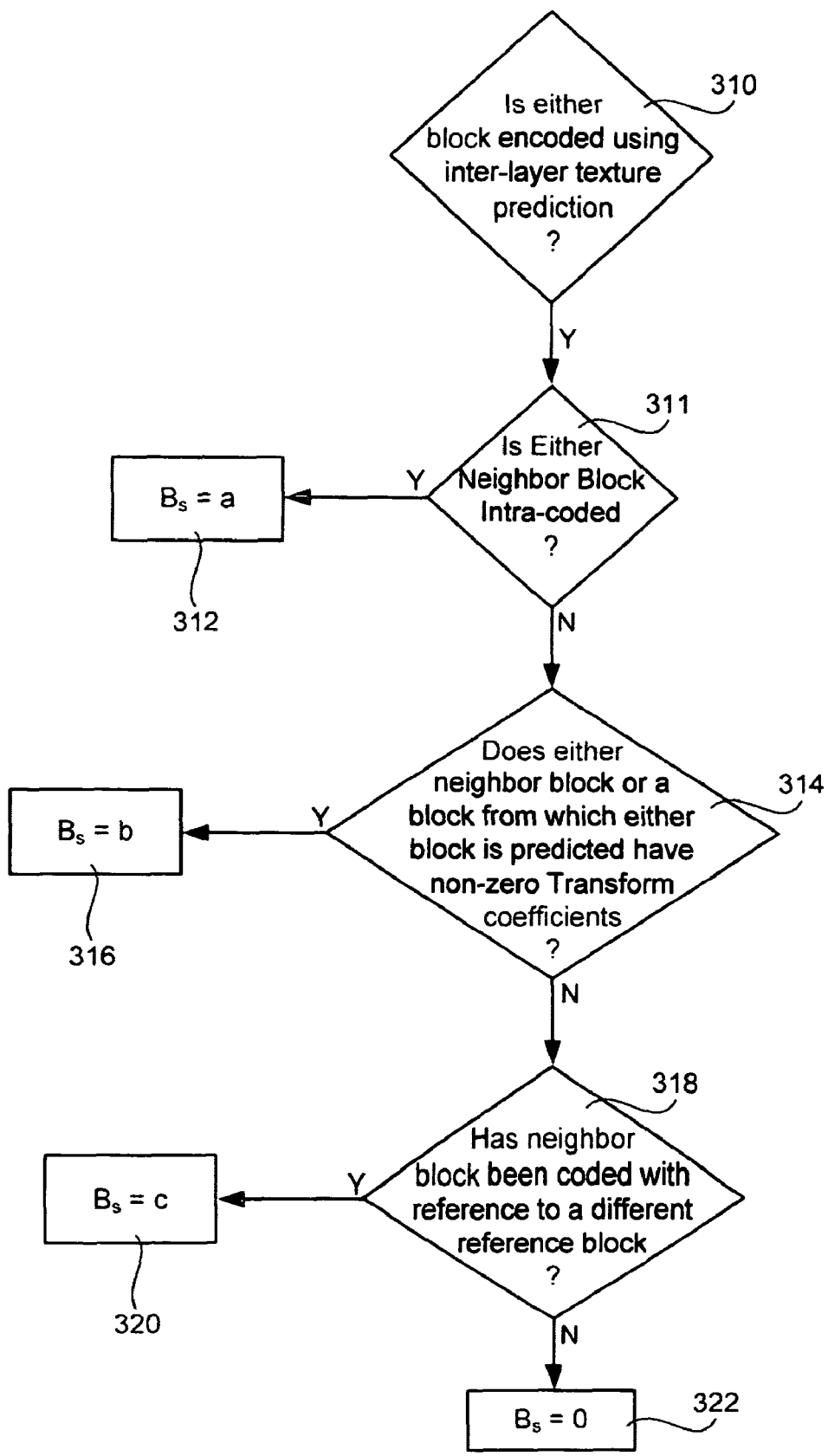
FIG. 28 is a flow chart showing an exemplary method for characterizing block boundaries based on neighboring block attributes.

Some embodiments of the present invention may be described with reference to FIG. 28. In these embodiments the boundary between neighboring blocks within a spatial scalability enhancement layer may be characterized for application of various filtering methods. These filtering methods may be associated with a boundary strength indicator 312, 316 & 320 that may be used to trigger various filtering methods or to adjust filtering parameters.

In these embodiments, the characteristics of two neighboring blocks, separated by a block boundary, are analyzed to characterize a block boundary adjacent to the blocks. In some embodiments the boundary between the blocks is characterized.

In exemplary embodiments, the block characteristics are first analyzed to determine whether one of the blocks is encoded using inter-layer texture prediction 310. If at least one of said neighboring blocks is encoded using inter-layer texture prediction, the blocks are then analyzed to determine whether either block has been encoded with an intra-prediction method other than inter-layer texture prediction 311. If one of the blocks has been encoded with an intra-prediction method other than inter-layer texture prediction, a first boundary strength indicator is used to characterize the target boundary 312.

If one of the blocks has not been encoded with an intra-prediction method other than inter-layer texture prediction, the block characteristics are analyzed to determine whether either of the neighboring blocks or a block from which one of the neighboring blocks was predicted has non-zero transform coefficients 314. If either of the neighboring blocks or a block from which one of the neighboring blocks was predicted has non-zero transform coefficients, a second boundary strength indicator is used to characterize the target boundary 316.

If one of the blocks has not been encoded with an intra-prediction method other than inter-layer texture prediction 311 and none of the neighboring blocks or a block from which one of the neighboring blocks was predicted has non-zero transform coefficients 314, a determination is made to determine whether the neighboring blocks are predicted with reference to different reference blocks 318. If the neighboring blocks are predicted with reference to different reference blocks 318, a third boundary strength indicator is used to characterize the target boundary 320.

If one of the blocks has not been encoded with an intra-prediction method other than inter-layer texture prediction 311, none of the neighboring blocks or a block from which one of the neighboring blocks was predicted has non-zero transform coefficients 314, and the neighboring blocks are not predicted with reference to different reference blocks 318, a fourth boundary strength indicator is used to characterize the target boundary 320.

In some embodiments, the boundary strength indicator may be used to trigger specific boundary filtering options. In some embodiments, a different filtering method may be used for each indicator. In some embodiments, a filtering method parameter may be adjusted in relation to the indicator. In some embodiments, the indicator may trigger how aggressively a boundary is filtered. In some exemplary embodiments, the first boundary strength indicator will trigger the most aggressive filtering of the boundary and the second, third and fourth boundary strength indicators will trigger less and less aggressive filtering in that order. In some embodiments, the fourth boundary strength indicator or another indicator will trigger no filtering at all for the associated boundary.

Figure 29A:
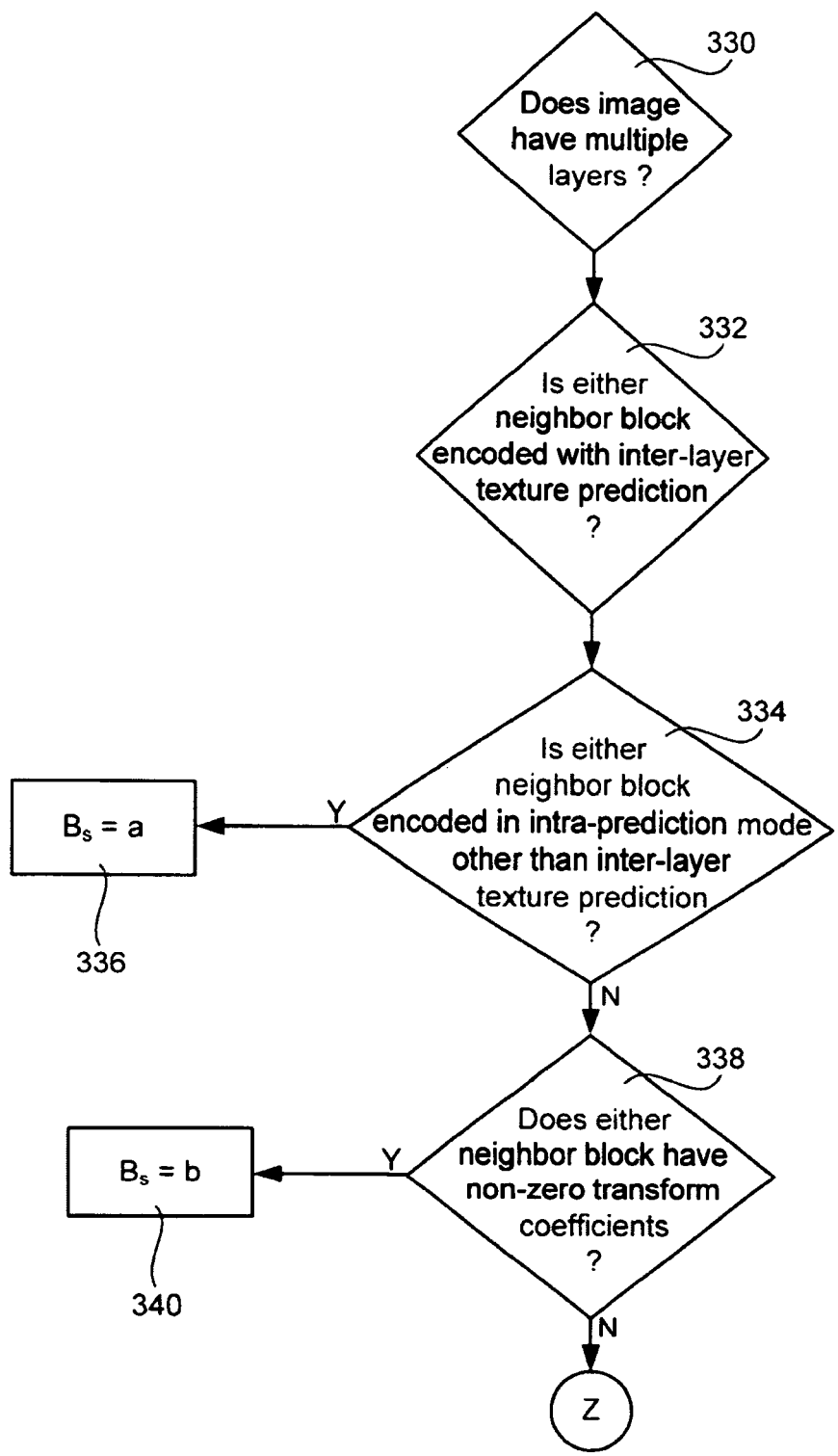
FIG. 29 is a flow chart showing an alternative exemplary method for characterizing block boundaries based on neighboring block attributes.
Figure 29B:
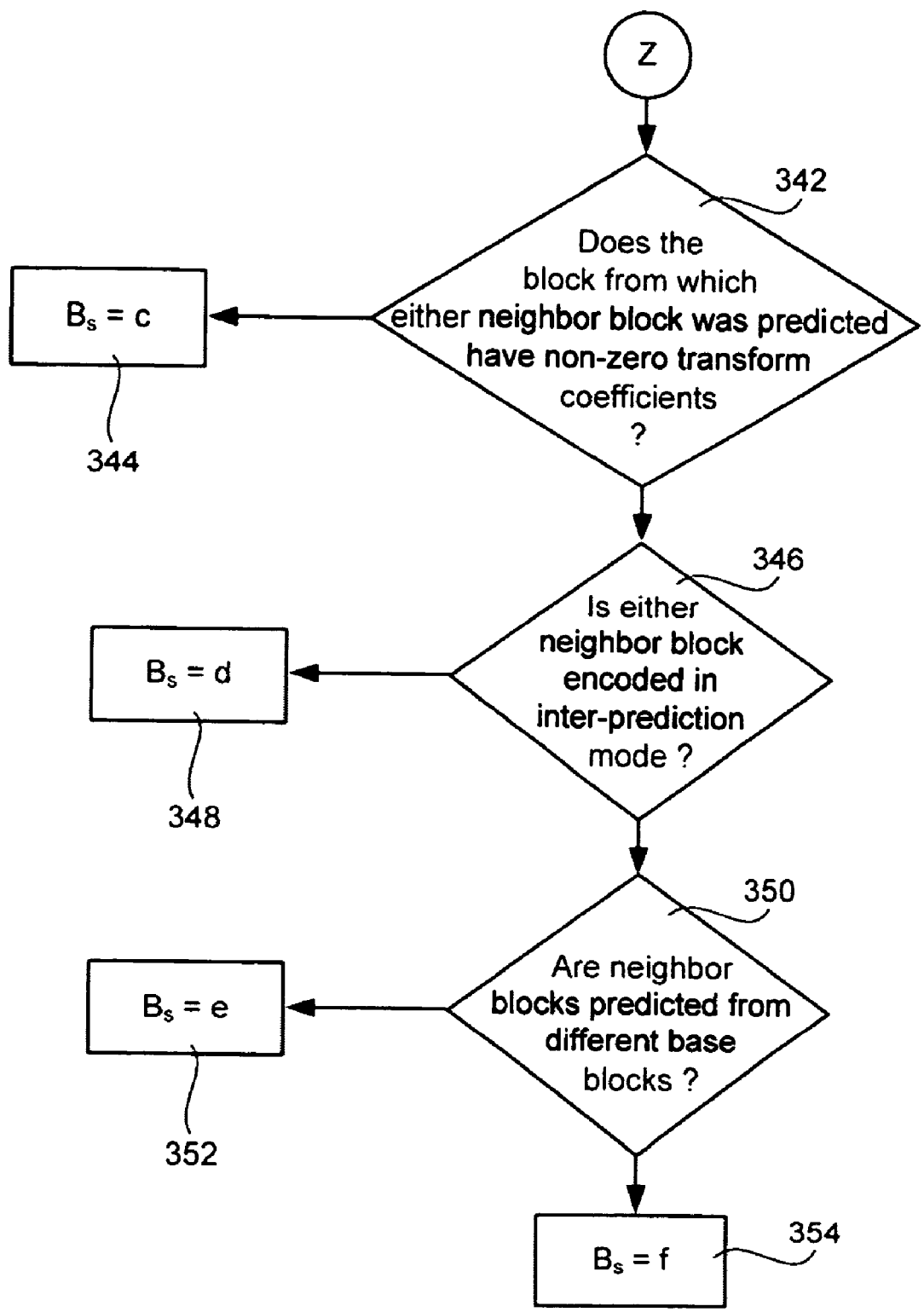

Some embodiments of the present invention may be described with reference to FIG. 29. In these embodiments the boundary between neighboring blocks within a spatial scalability enhancement layer may be characterized for application of various filtering methods. These filtering methods may be associated with a boundary strength indicator 336, 340, 344, 348 & 352 that may be used to trigger various filtering methods or to adjust filtering parameters.

In these embodiments, the characteristics of two neighboring blocks, separated by a block boundary, are analyzed to characterize a block boundary adjacent to the blocks. In some embodiments the boundary between the blocks is characterized.

In exemplary embodiments, the block characteristics are first analyzed to determine whether the blocks are in a spatial scalability layer 330. Another determination is then made to determine whether one of the blocks is encoded using inter-layer texture prediction 332. If at least one of said neighboring blocks is encoded using inter-layer texture prediction, the blocks are then analyzed to determine whether either block has been encoded with an intra-prediction method other than inter-layer texture prediction 334. If one of the blocks has been encoded with an intra-prediction method other than inter-layer texture prediction, a first boundary strength indicator is used to characterize the target boundary 336.

If one of the blocks has not been encoded with an intra-prediction method other than inter-layer texture prediction, the block characteristics are analyzed to determine whether either of the neighboring blocks has non-zero transform coefficients 338. If either of the neighboring blocks has non-zero transform coefficients, a second boundary strength indicator is used to characterize the target boundary 340.

If one of the blocks has not been encoded with an intra-prediction method other than inter-layer texture prediction, the block characteristics may be analyzed to determine whether a block from which one of the neighboring blocks was predicted has non-zero transform coefficients 342. If a block from which one of the neighboring blocks were predicted has non-zero transform coefficients, a third boundary strength indicator is used to characterize the target boundary 344.

If one of the blocks has not been encoded with an intra-prediction method other than inter-layer texture prediction 334 and none of the neighboring blocks or a block from which one of the neighboring blocks was predicted has non-zero transform coefficients 338, 342, a determination is made to determine whether one of the neighboring blocks is encoded using an inter-prediction mode 346. If one of the neighboring blocks is encoded using an inter-prediction mode 346, a fourth boundary strength indicator may be used to characterize the target boundary 348.

If one of the blocks has not been encoded with an intra-prediction method other than inter-layer texture prediction 334 and none of the neighboring blocks or a block from which one of the neighboring blocks was predicted has non-zero transform coefficients 338, 342, a determination may be made to determine whether the neighboring blocks are predicted with reference to different reference blocks 350. If the neighboring blocks are predicted with reference to different reference blocks 350, a fifth boundary strength indicator is used to characterize the target boundary 352.

If one of the blocks has not been encoded with an intra-prediction method other than inter-layer texture prediction 334 and none of the neighboring blocks or a block from which one of the neighboring blocks was predicted has non-zero transform coefficients 338, 342, the blocks are not encoded in inter-prediction mode 346 and the neighboring blocks are not predicted with reference to different reference blocks 350, a sixth boundary strength indicator may be used to characterize the target boundary 354.

Figure 30A:
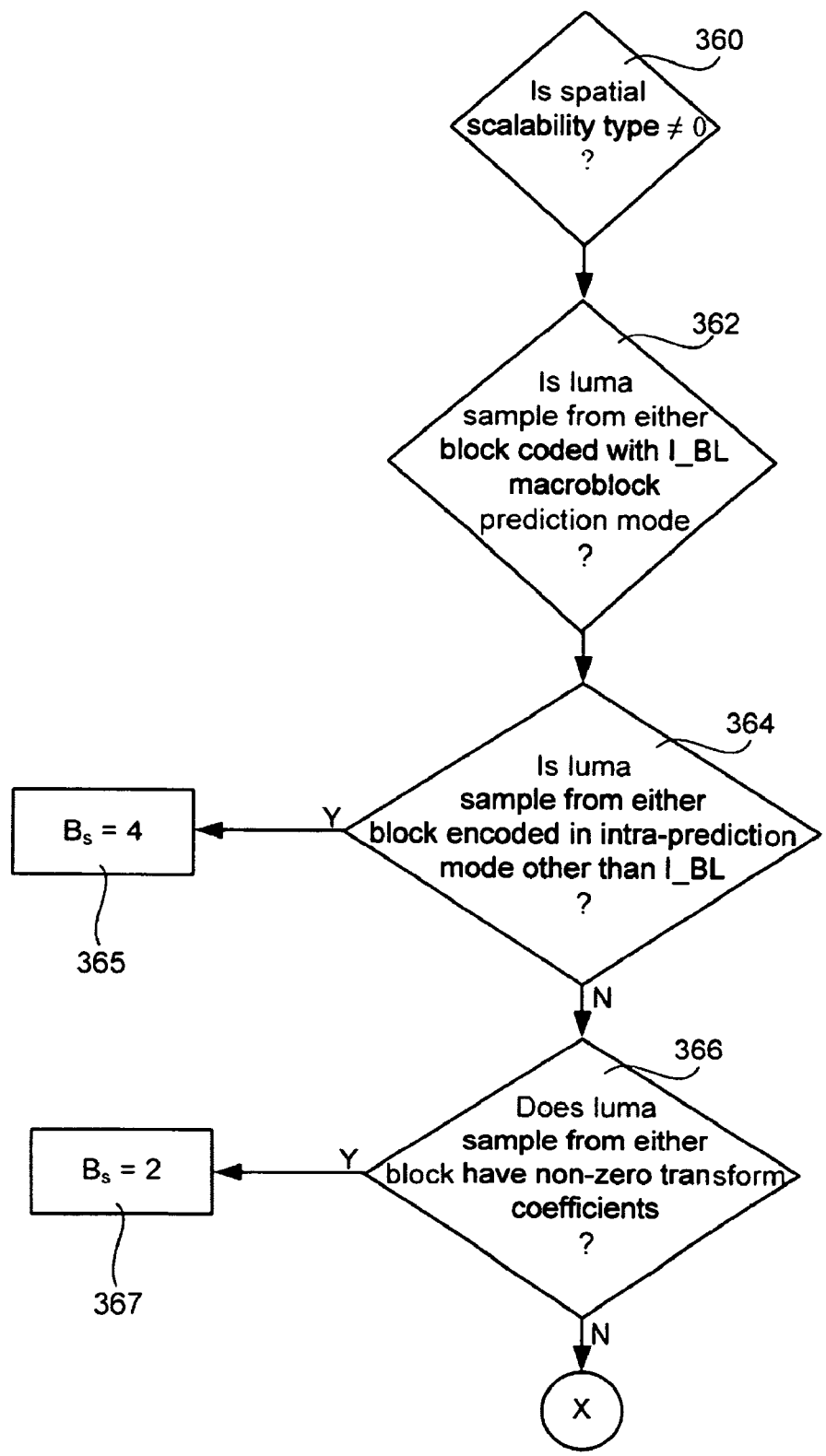
FIG. 30 is a flow chart showing another alternative exemplary method for characterizing block boundaries based on neighboring block attributes.
Figure 30B:
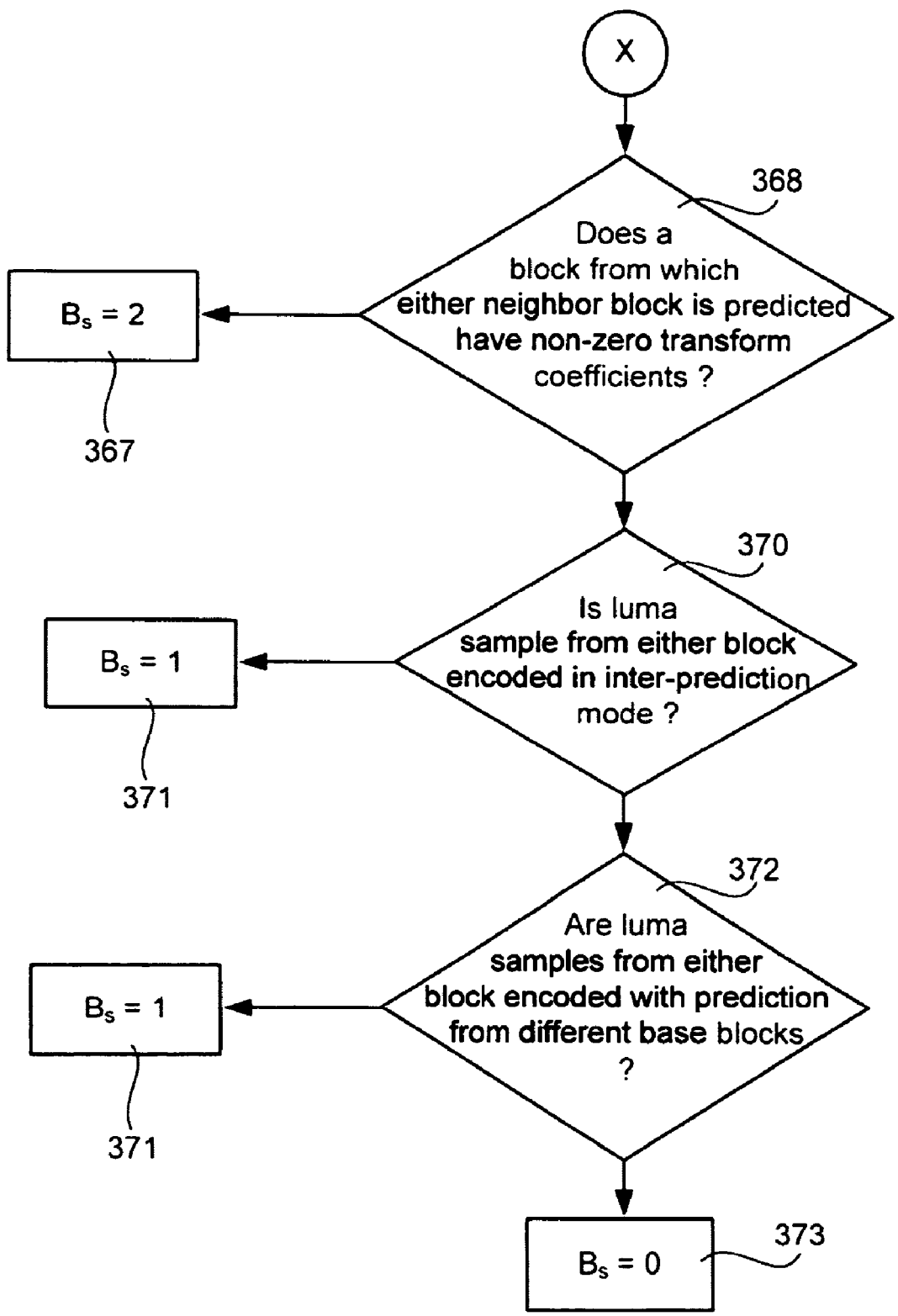

Some embodiments of the present invention may be described with reference to FIG. 30. In these embodiments the boundary between neighboring blocks within a spatial scalability enhancement layer may be characterized for application of various filtering methods. These filtering methods may be associated with a boundary strength indicator 365, 367, 371 & 373 that may be used to trigger various filtering methods or to adjust filtering parameters. In some embodiments a boundary strength indicator of 0 indicates filter operation skipping.

In these embodiments, the characteristics of two neighboring blocks, separated by a block boundary, are analyzed to characterize a block boundary adjacent to the blocks. In some embodiments the boundary between the blocks is characterized.

In these embodiments, a SpatialScalabilityType must be non-zero 360. Another determination is then made to determine whether a luma sample from one of the blocks is encoded using inter-layer texture prediction 362 (I_BL). If at least one of said neighboring blocks is encoded using I_BL, the blocks are then analyzed to determine whether either block has been encoded with an intra-prediction method other than I_BL 364. If one of the blocks has been encoded with an intra-prediction method other than I_BL, a first boundary strength indicator is used to characterize the target boundary 365. In some embodiments the first boundary strength indicator will trigger the strongest or most aggressive deblocking filter operation. In some embodiments, this first indicator will be equal to 4.

If one of the blocks has not been encoded with an intra-prediction method other than I_BL, the block characteristics are analyzed to determine whether the luma samples of either of the neighboring blocks has non-zero transform coefficients 366. If the luma samples of either of the neighboring blocks has non-zero transform coefficients, a second boundary strength indicator is used to characterize the target boundary 367. In some embodiments this second boundary strength indicator will trigger an intermediate or second most aggressive deblocking filter operation. In some embodiments, this second indicator will be equal to 2.

If one of the blocks has not been encoded with an intra-prediction method other than I_BL 364 and none of the luma samples from either block have non-zero transform coefficients, a determination may be made to determine whether a block from which one of the neighboring blocks was predicted has non-zero transform coefficients 368. If a block from which one of the neighboring blocks was predicted has non-zero transform coefficients, the second boundary strength indicator may again be used to characterize the target boundary 367.

If one of the blocks has not been encoded with an intra-prediction method other than I_BL 364 and none of the neighboring blocks 366 or a block from which one of the neighboring blocks was predicted has non-zero transform coefficients 368, a determination may be made to determine whether the luma samples of one of the neighboring blocks is encoded using an inter-prediction mode 370. If the luma samples of one of the neighboring blocks is encoded using an inter-prediction mode 370, a third boundary strength indicator may be used to characterize the target boundary 371. In some embodiments this third boundary strength indicator will trigger an weaker or third most aggressive deblocking filter operation. In some embodiments, this third indicator will be equal to 1.

If one of the blocks has not been encoded with an intra-prediction method other than I_BL 364, none of the neighboring blocks 366 nor a block from which one of the neighboring blocks was predicted has non-zero transform coefficients 368 and the luma samples of neighboring blocks are not encoded in inter-prediction mode 370, a determination may be made to determine whether luma samples from either of the neighboring blocks are predicted from different reference blocks 372. If the luma samples of any of the neighboring blocks are predicted with reference to different reference blocks 370, the third boundary strength indicator may again be used to characterize the target boundary 371.

If one of the blocks has not been encoded with an intra-prediction method other than I_BL 364, none of the neighboring blocks 366 nor a block from which one of the neighboring blocks was predicted has non-zero transform coefficients 368, the luma samples of neighboring blocks are not encoded in inter-prediction mode 370 and luma samples from the neighboring blocks are not predicted from different reference blocks 372, a fourth boundary strength indicator may be used to characterize the target boundary 373. In some embodiments this fourth boundary strength indicator may trigger a weakest or fourth most aggressive deblocking filter operation. In some embodiments, this fourth indicator may indicate that no filtering should take place. In some embodiments, this third indicator will be equal to 0.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

I claim:

1. A method for characterization of a block boundary between neighboring image blocks within a spatial scalability enhancement layer wherein at least one of said neighboring image blocks is encoded using inter-layer texture prediction, said method comprising:
   operating a block identifying portion to identify the neighboring image blocks;
   characterizing said block boundary between neighboring image blocks identified by said block identifying portion with a first boundary strength indicator when one of said identified neighboring image blocks is determined to be encoded using an intra-prediction mode other than said inter-layer texture prediction.

2. A method as described in claim 1 further comprising:
characterizing said block boundary between neighboring image blocks identified by said block identifying portion with a second boundary strength indicator when, said identified neighboring image blocks are not encoded using an intra-prediction mode other than said inter-layer texture prediction; and
any of said neighboring image blocks and blocks from which said neighboring image blocks are predicted have non-zero transform coefficients.

3. A method as described in claim 2 further comprising:
characterizing said block boundary between neighboring image blocks identified by said block identifying portion with a third boundary strength indicator when, said identified neighboring image blocks are not encoded using an intra-prediction mode other than said inter-layer texture prediction;
all of said neighboring image blocks and blocks from which said neighboring image blocks are predicted have no transform coefficients; and
said neighboring image blocks are predicted with reference to different reference blocks.

4. A method as described in claim 3 further comprising:
characterizing said block boundary between neighboring image blocks identified by said block identifying portion with a fourth boundary strength indicator when, said identified neighboring image blocks are not encoded using an intra-prediction mode other than said inter-layer texture prediction;
all of said neighboring image blocks and blocks from which said neighboring image blocks are predicted have no transform coefficients; and said neighboring image blocks are not predicted with reference to different reference blocks.

5. A method as described in claim 4 further comprising applying a deblocking filter to filter said block boundary, the strength of filtering by the deblocking filter being determined by each boundary strength indicator, wherein said first boundary strength indicator triggers more aggressive smoothing by the deblocking filter than said second boundary strength indicator, said second boundary strength indicator triggers more aggressive smoothing by the deblocking filter than said third boundary strength indicator and said third boundary strength indicator triggers more aggressive smoothing by the deblocking filter than said fourth boundary strength indicator when applying the deblocking filter to filter said block boundary.

6. A method as described in claim 2 further comprising applying a deblocking filter to filter said block boundary, the strength of filtering by the deblocking filter being determined by each boundary strength indicator, wherein
said first boundary strength indicator triggers more aggressive smoothing by the deblocking filter than said second boundary strength indicator when applying the deblocking filter to filter said block boundary.

7. A method as described in claim 3 further comprising applying a deblocking filter to filter said block boundary, the strength of filtering by the deblocking filter being determined by each boundary strength indicator, wherein said first boundary strength indicator triggers more aggressive smoothing by the deblocking filter than said second boundary strength indicator and said second boundary strength indicator triggers more aggressive smoothing by the deblocking filter than said third boundary strength indicator when applying the deblocking filter to filter said block boundary.

8. A method as described in claim 1 further comprising:
characterizing said block boundary between neighboring image blocks identified by said block identifying portion with a second boundary strength indicator when, said identified neighboring image blocks are not encoded using an intra-prediction mode other than said inter-layer texture prediction; and
said neighboring image blocks are predicted with reference to different reference blocks.

9. A method as described in claim 8 further comprising applying a deblocking filter to filter said block boundary, the strength of filtering by the deblocking filter being determined by each boundary strength indicator, wherein said first boundary strength indicator triggers more aggressive smoothing by the deblocking filter than said second boundary strength indicator when applying the deblocking filter to filter said block boundary.

10. A system for characterization of a block boundary between neighboring image blocks within a spatial scalability enhancement layer wherein at least one of said neighboring image blocks is encoded using inter-layer texture prediction, said system comprising:
a block identifying portion configured to identify the neighboring image blocks; and
a prediction mode analyzer for characterizing said block boundary between neighboring image blocks identified by said block identifying portion with a first boundary strength indicator when one of said neighboring image blocks is encoded using an intra-prediction mode other than said inter-layer texture prediction.

11. A system as described in claim 10 further comprising:
a coefficient analyzer for characterizing said block boundary between neighboring image blocks identified by said block identifying portion with a second boundary strength indicator when, said neighboring image blocks are not encoded using an intra-prediction mode other than said inter-layer texture prediction; and any of said neighboring image blocks and blocks from which said neighboring image blocks are predicted have non-zero transform coefficients.

12. A system as described in claim 11 further comprising:
a) a second prediction reference block analyzer for characterizing said block boundary between neighboring image blocks identified by said block identifying portion with a third boundary strength indicator when, i) said neighboring image blocks are not encoded using an intra-prediction mode other than said inter-layer texture prediction; ii) all of said neighboring image blocks and blocks from which said neighboring image blocks are predicted have no transform coefficients; and iii) said neighboring image blocks are predicted with reference to different reference blocks.

13. A system as described in claim 12 further comprising:
a block boundary analyzer for characterizing said block boundary between neighboring image blocks identified by said block identifying portion with a fourth boundary strength indicator when, said neighboring image blocks are not encoded using an intra-prediction mode other than said inter-layer texture prediction; all of said neighboring image blocks and blocks from which said neighboring image blocks are predicted have no transform coefficients; and said neighboring image blocks are not predicted with reference to different reference blocks.

14. A method as described in claim 13 further comprising a deblocking filter operable to filter said block boundary, the strength of filtering by the deblocking filter being determined by each boundary strength indicator, wherein said first boundary strength indicator triggers more aggressive smoothing by the deblocking filter than said second boundary strength indicator, said second boundary strength indicator triggers more aggressive smoothing by the deblocking filter than said third boundary strength indicator and said third boundary strength indicator triggers more aggressive smoothing by the deblocking filter than said fourth boundary strength indicator when applying the deblocking filter to filter said block boundary.

15. A system as described in claim 11 further comprising a deblocking filter operable to filter said block boundary, the strength of filtering by the deblocking filter being determined by each boundary strength indicator, wherein said first boundary strength indicator triggers more aggressive smoothing by the deblocking filter than said second boundary strength indicator when applying the deblocking filter to filter said block boundary.

16. A method as described in claim 12 further comprising a deblocking filter operable to filter said block boundary, the strength of filtering by the deblocking filter being determined by each boundary strength indicator, wherein said first boundary strength indicator triggers more aggressive smoothing by the deblocking filter than said second boundary strength indicator and said second boundary strength indicator triggers more aggressive smoothing by the deblocking filter than said third boundary strength indicator when applying the deblocking filter to filter said block boundary.

17. A system as described in claim 10 further comprising: a prediction reference block analyzer for characterizing said block boundary between neighboring image blocks identified by said block identifying portion with a second boundary strength indicator when, said neighboring image blocks are not encoded using an intra-prediction mode other than said inter-layer texture prediction; and said neighboring image blocks are predicted with reference to different reference blocks.

18. A method as described in claim 17 further comprising a deblocking filter operable to filter said block boundary, the strength of filtering by the deblocking filter being determined by each boundary strength indicator, wherein said first boundary strength indicator triggers more aggressive smoothing by the deblocking filter than said second boundary strength indicator when applying the deblocking filter to filter said block boundary.

* * * * *